United States Patent
Ritchey et al.

(10) Patent No.: US 9,379,552 B2
(45) Date of Patent: Jun. 28, 2016

(54) POWER CONVERSION SYSTEM FOR A MULTI-STAGE GENERATOR

(71) Applicant: EXRO TECHNOLOGIES INC., Vancouver (CA)

(72) Inventors: Jonathan Ritchey, Vernon (CA); Edwin Nowicki, West Vancouver (CA); Richerd Chan, West Vancouver (CA)

(73) Assignee: EXRO TECHNOLOGIES INC., Vancouver (CA)

( * ) Notice: Subject to any disclaimer, the term of this patent is extended or adjusted under 35 U.S.C. 154(b) by 0 days.

(21) Appl. No.: 14/459,022

(22) Filed: Aug. 13, 2014

(65) Prior Publication Data
US 2015/0188317 A1  Jul. 2, 2015

Related U.S. Application Data

(63) Continuation of application No. 13/062,191, filed as application No. PCT/CA2009/001233 on Sep. 3, 2009, now abandoned.

(60) Provisional application No. 61/094,007, filed on Sep. 3, 2008.

(51) Int. Cl.
| | |
|---|---|
| *H02J 1/00* | (2006.01) |
| *H02J 3/00* | (2006.01) |
| *H02J 3/46* | (2006.01) |
| *H02P 9/02* | (2006.01) |
| *F03D 9/00* | (2016.01) |

(Continued)

(52) U.S. Cl.
CPC . *H02J 3/46* (2013.01); *F03D 9/003* (2013.01); *H02J 3/005* (2013.01); *H02K 7/116* (2013.01); *H02K 7/1823* (2013.01); *H02P 9/02* (2013.01); *H02P 2101/15* (2015.01); *Y10T 307/696* (2015.04); *Y10T 307/707* (2015.04)

(58) Field of Classification Search
USPC .......................................................... 307/80
See application file for complete search history.

(56) References Cited

U.S. PATENT DOCUMENTS

| | | |
|---|---|---|
| 3,593,112 A | 7/1971 | Coats et al. |
| 3,663,828 A | 5/1972 | Low et al. |

(Continued)

FOREIGN PATENT DOCUMENTS

| | | |
|---|---|---|
| CN | 101582672 A | 11/2009 |
| EP | 1 416 604 A2 | 5/2004 |

(Continued)

OTHER PUBLICATIONS

Chinese Office Action dated Mar. 29, 2013, for corresponding CN Application No. 200980134484.6, with English translation, 8 pages.

(Continued)

*Primary Examiner* — Dharti Patel
(74) *Attorney, Agent, or Firm* — Seed IP Law Group PLLC

(57) ABSTRACT

An electric power generation system is provided, including a generator having a plurality of stages engaged by a prime mover; and a plurality of branches for connecting the stages to an electrical load, each of the branches having a switch for connecting or disconnecting the branch to the stages. Power from a prime mover, such as a turbine, is sent by a controller to one or more of the branches as appropriate to handle the power level generated.

12 Claims, 14 Drawing Sheets

(51) Int. Cl.
    *H02K 7/116* (2006.01)
    *H02K 7/18* (2006.01)
    *H02P 101/15* (2015.01)

(56) References Cited

U.S. PATENT DOCUMENTS

| | | | |
|---|---|---|---|
| 3,870,928 | A | 3/1975 | Allen |
| 3,984,750 | A | 10/1976 | Pfeffer et al. |
| 4,338,557 | A | 7/1982 | Wanlass |
| 4,394,720 | A | 7/1983 | Gabor |
| 4,419,618 | A | 12/1983 | Gretsch |
| 4,639,647 | A | 1/1987 | Posma |
| 5,146,146 | A | 9/1992 | Sämann |
| 5,912,522 | A | 6/1999 | Rivera |
| 6,124,702 | A | 9/2000 | Pinkerton et al. |
| 6,349,312 | B1 | 2/2002 | Fresko et al. |
| 6,366,060 | B1 | 4/2002 | Ely et al. |
| 6,563,717 | B2 | 5/2003 | Lunding et al. |
| 7,026,794 | B1 | 4/2006 | French et al. |
| 7,081,696 | B2 | 7/2006 | Ritchey |
| 7,102,248 | B2 | 9/2006 | Wobben |
| 7,227,340 | B2 | 6/2007 | Chen |
| 7,348,764 | B2 | 3/2008 | Stewart et al. |
| 7,405,490 | B2 | 7/2008 | Moehlenkamp |
| 7,545,052 | B2 | 6/2009 | Llorente González et al. |
| 7,554,303 | B1 | 6/2009 | Kawamura |
| 7,602,158 | B1 | 10/2009 | Iacob |
| 7,649,274 | B2 | 1/2010 | Burt |
| 7,710,081 | B2 | 5/2010 | Saban et al. |
| 8,039,982 | B2 | 10/2011 | Scholte-Wassink |
| 8,097,970 | B2 | 1/2012 | Hyvärinen |
| 8,138,620 | B2 | 3/2012 | Wagoner et al. |
| 8,212,371 | B2 | 7/2012 | Maibach et al. |
| 8,212,534 | B2 | 7/2012 | Moehlenkamp et al. |
| 8,466,595 | B2 | 6/2013 | Spooner |
| 2002/0057030 | A1 | 5/2002 | Fogarty |
| 2004/0100102 | A1 | 5/2004 | Wobben |
| 2006/0066109 | A1 | 3/2006 | Nasr |
| 2006/0214428 | A1 | 9/2006 | Altemark et al. |
| 2007/0073445 | A1 | 3/2007 | Llorente Gonzalez et al. |
| 2007/0121353 | A1 | 5/2007 | Zhang et al. |
| 2008/0088200 | A1 | 4/2008 | Ritchey |
| 2008/0116759 | A1 | 5/2008 | Lin |
| 2009/0267414 | A1 | 10/2009 | Kiyohara et al. |
| 2009/0322082 | A1 | 12/2009 | Wagoner et al. |
| 2009/0322083 | A1* | 12/2009 | Wagoner et al. ............ 290/44 |
| 2010/0073970 | A1 | 3/2010 | Abolhassani et al. |
| 2010/0096932 | A1 | 4/2010 | Nikolov |
| 2011/0241630 | A1 | 10/2011 | Ritchey et al. |
| 2012/0194403 | A1 | 8/2012 | Cordier et al. |
| 2012/0229060 | A1 | 9/2012 | Ritchey et al. |
| 2014/0347903 | A1 | 11/2014 | Ritchey et al. |

FOREIGN PATENT DOCUMENTS

| | | |
|---|---|---|
| JP | 2001-204198 A | 7/2001 |
| KR | 10-2007-0082819 A | 8/2007 |
| WO | 81/00651 A1 | 3/1981 |
| WO | 88/07782 A1 | 10/1988 |
| WO | 2008/119864 A1 | 10/2008 |

OTHER PUBLICATIONS

First Office Action and Search Report (with English Translation) from corresponding CN application No. 201080039251.0, mailed Jan. 30, 2014, 16 pages.

International Search Report, mailed Dec. 7, 2009, for PCT/CA2009/001233, 3 pages.

International Search Report, mailed May 24, 2011, for PCT/US2010/047750, 3 pages.

Written Opinion, mailed May 24, 2011, for PCT/US2010/047750, 4 pages.

* cited by examiner

POWER CONVERSION SYSTEM FOR A MULTI-STAGE GENERATOR

FIELD OF THE INVENTION

This application relates to circuit topologies and associated control processes for converting power generated via an electromagnetic machine into usable power, and more particularly for converting power generated from a multi-stage electrical generator into a usable form of power for consumption by an electrical load, such as, but not restricted to, an electric utility power grid.

BACKGROUND OF THE INVENTION

For conventional fluid-flow electrical-generation turbine systems, such as wind turbine systems, in which the energy source is variable (i.e. the fluid speed and the rate of flow of the fluid varies over time), the amount of energy captured from the energy source may only be a fraction of the total of the energy that may be capturable over time. For example, in a typical wind farm, that fraction may be one half, or less.

The power flow though a variable-speed conventional turbine/generator/transformer system is restricted in the range of power it can output, i.e., from a minimum output power to a rated output power, because of limitations of the generator, the power converter (if present), and the output transformer used within the system. This restriction arises because a conventional electromagnetic generator has reduced efficiency at lower power levels, as does the power converter (if present) and particularly the transformer that couples power to the electrical load. As a result, for the conventional variable-speed turbine/generator/transformer system an engineering design decision is usually made to limit the power rating of the generator (and any associated power converter, power conditioner or power filter, if present) and the associated output transformer so as to optimize efficiency over a restricted range of power. Therefore, at the extremes of normal-operating fluid speeds, i.e., at a low fluid speed and especially at a high fluid speed, less power is coupled into the turbine than it is possible to extract from the fluid energy source. For a given design of turbine diameter (and possibly axial length) this translates, over time, into less energy capture than the turbine may be capable of transmitting to the generator.

To increase energy capture in situations in which the energy source has a variable speed of fluid driving the turbine, and in which the turbine may have a variable speed of rotation, a multi-stage generator may be used in the turbine system. A multi-stage generator is an electromagnetic machine operating as an electrical generator that takes mechanical energy from a prime mover and generates electrical energy, usually in the form of AC power. Such a multi-stage generator is disclosed in U.S. Pat. No. 7,081,696 and U.S. Patent Application Publication No. 2008/0088200, which are both hereby incorporated by reference. An advantage of a multi-stage generator over a conventional generator is that a multi-stage generator can be dynamically sized depending on the power output of the turbine. A conventional generator is effective at capturing energy from the energy source over a limited range of fluid speeds, whereas a multi-stage generator is able to capture energy over an extended range of fluid speeds of the energy source, due to staged power characteristics.

The electrical power that is generated from a multi-stage generator is variable in nature, meaning the output power waveforms produced may vary from time to time, for example in: voltage amplitude; current amplitude; phase; and/or frequency. Additionally a multi-stage generator may include a number of induction elements, each of which generates its own power waveform, which may differ in voltage amplitude, current amplitude, phase, and/or frequency, from that generated by other induction elements within the generator. An electrical load such as an electric utility power grid may not be capable of consuming directly the electrical power that is generated by a multi-stage generator, as the power generated may not be in the correct form, for example, with respect to waveform shape as a function of time, voltage amplitude, current amplitude, phase, and/or frequency, as may be required by the electrical load. An electrical load such as a utility power grid typically expects from a turbine electrical generation system a single-phase, or split-phase, or 3-phase voltage or current waveform that is usually sinusoidal, and relatively stable, but a multi-stage generator generates varying waveforms.

A power converter circuit may be used to transform electrical power waveforms from one form to another form. Converters may be designed for a specific rating of the input voltage range (e.g. 1000 VAC-rms to 2000 VAC-rms) and input current range rating (e.g. 100 A-rms to 500 A-rms), but if the input voltage or input current (and therefore power level) do not meet or exceed the levels for which the converter is designed, then the converter may not be capable of operation, or the converter may operate in an inefficient manner. For a multi-stage generator a single power converter is unlikely to accommodate the widely varying voltage waveforms and power range that is generated. Moreover, a single power transformer delivering power to the electrical load, connected to one or more converters, is unlikely to accommodate with reasonable efficiency the wide range of power that may be generated by a multi-stage generator.

SUMMARY OF THE INVENTION

To take advantage of the electrical energy generated by the multi-stage generator, it is desirable to provide a power conversion system that combines and converts a portion, or all, of the electrical power waveforms generated by the multi-stage generator into a usable form consumable by an electrical load. The conversion system should maintain a high level of efficiency and facilitate the multi-stage generator to operate efficiently and effectively over the power range that the generator is capable of producing; meaning the power conversion process should not limit the range (from the lowest level to highest level) of power that may be generated by the multi-stage generator.

A suitable power conversion system, including an associated control process, is desirable to take advantage of the benefits of using a multi-stage generator within a turbine electrical generation system, resulting in a higher energy capture of the energy source over a wider range of fluid speeds (or over a wider range of fluid flow-rates) compared to conventional turbine electrical generation systems.

Further, for a multi-stage generator to function near-optimally (such as delivering a near-maximum power to the electrical load with a near-minimum of losses in the turbine/generator/converter system), over a wide range of fluid speeds or a wide range of fluid flow-rates, with existing turbines, a controller can be used to control the power conversion electronics that process the output power waveforms of the generator. When desirable, a controller can also allow the system to seek to maximize the amount of energy capture from the energy source by seeking to optimize the turbine's parameters, such as blade pitch and turbine yaw, in response to time-dependent characteristics of the energy source such as the fluid speed and direction of flow. Based on these and other inputs, the system's electronic power conversion process would choose the near-optimal conversion strategy for delivering power to the electrical load.

An electric power generation system is provided, including a power generator having a plurality of machine configurations, the configurations selectively engageable by a prime mover; and a plurality of branches for connecting the configurations to an electrical load, each of the branches having a switch for connecting or disconnecting the branch to the configuration.

A method of connecting a power generator having a plurality of stages, to an electrical load, is provided, each of the stages being connected to the load via a corresponding branch having a converter, each of the converters having a differing power range, including the steps of: (a) determining a power output of the generator; (b) selecting one of the branches, wherein the power output of the selected branch has a converter capable of accepting the power output; and (c) passing the power output to the electrical load along the selected branch.

A method of connecting a power generator having a plurality of stages, to an electrical load is provided, each of the stages connected to the load via a corresponding branch having a converter and a parallel series selector, each of the converters having the same power range, including the steps of: (a) determining a power output of the generator; (b) configuring at least one of the parallel series selector for the power output; (c) selecting one or more of the branches corresponding to the configured parallel series selectors; and (d) passing the power output to the electrical load along the selected branches.

An electric power generation system is provided, including a power generator having a plurality of stages, each of the stages having at least an induction element, the induction elements engaged by a turbine; a plurality of branches for connecting the stages to an electrical load, each of the branches having a switch for connecting or disconnecting the branch to the stages; a turbine; and a system controller.

BRIEF DESCRIPTION OF THE DRAWINGS

The following figures set forth embodiments of the invention in which like reference numerals denote like parts. Embodiments of the invention are illustrated by way of example and not by way of limitation in the accompanying figures.

DETAILED DESCRIPTION OF THE INVENTION

Definitions

Figure 1:
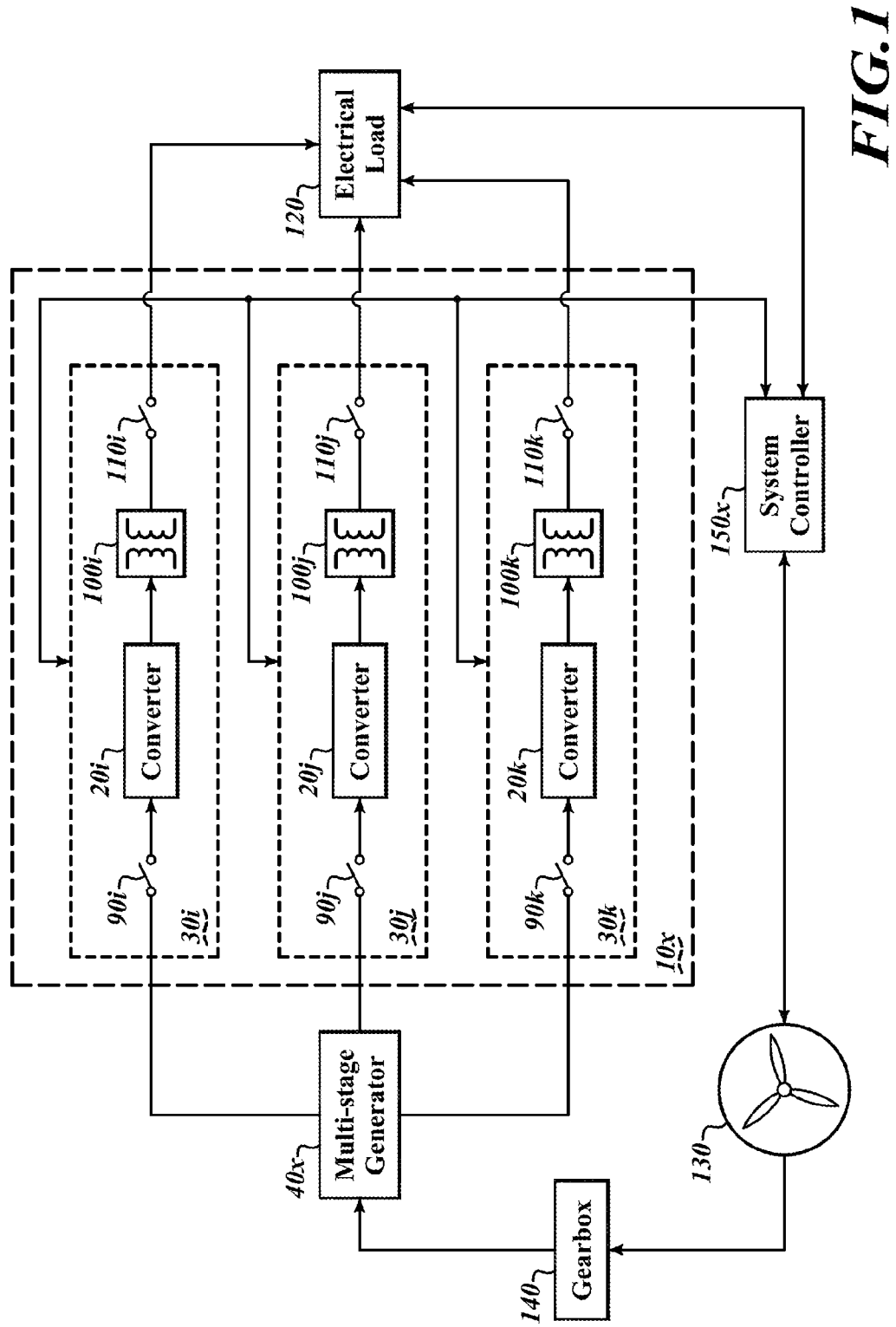
FIG. 1 is a block diagram of an embodiment of a turbine/generator/converter (TGC) system.

In this document, the following terms will have the following meanings:

"energy source" means a fluid medium, for example such as air, water, or steam, in motion, possessing kinetic energy due to translational motion.

"prime mover" means a device, such as a turbine or drive motor acted on by a power source, such as an energy source, to produce mechanical energy.

"turbine" means a device, usually including blades or fins, connected to a shaft, that are acted upon by an energy source to produce mechanical energy in the form of rotational motion of the shaft. It includes turbines used to harness energy from wind, tide, run-of-river and solar and other renewable energy sources.

"multi-stage generator" means an electromagnetic machine that converts mechanical energy from a turbine into electrical energy. Electrical power may be generated by a multi-stage generator from a number of induction elements that can each produce a voltage. Some induction elements may be hardwired, either within the multi-stage generator casing or external to the casing (although a casing need not be present). The multi-stage generator may be a motor operating in generation mode.

"induction element" means a coil of insulated metallic wire that generates a voltage across terminals as the wire passes though a magnetic field.

"stage" means a logical grouping of induction elements. The induction elements within a stage may have an almost equal frequency of the voltage waveform. A stage may have all induction elements operating in phase, or poly-phase induction elements may be present in the stage. A stage may or may not have a phase equal to another stage.

"machine configuration" means the sizing and configuration of induction elements, and may including the staging of induction elements.

"parallel series selector" or "parser" means an electronic or mechanical or electro-mechanical switching device that connects induction elements together in a number of configurable arrangements of parallel and/or series combinations. A parser may also be referred to as a "configurator".

"power converter" or "converter" means an electronic circuit that changes the form (e.g. waveform shape as a function of time, voltage amplitude, current amplitude, phase, and/or frequency) of electrical power waveforms. A converter may include a rectification step.

"turbine/generator/converter system" or "TGC system" means a system including a turbine, an electrical generator (such as a multi-stage generator) and a power converter. A TGC system may optionally further include some or all of the following components: ring gear or gearbox; parser(s); transformer(s); switch(es); and control system(s). A TGC system transforms a portion of the kinetic energy of an energy source into electrical energy.

"electrical load" means a consumer of electrical energy, and may be a stand-alone off-grid application, for example electrical devices within a residence, commercial building or industrial process; or may be a micro-grid system providing electrical energy for an isolated rural village; or a large electric utility power grid; or other application.

"power conversion topology" means an arrangement of hardware components, such as one or more, parsers, power converters, transformers, and switches. A power conversion topology may be used as an interface between a multi-stage generator and an electrical load.

"power conversion system" means a power conversion topology and its associated controller. A power conversion system may be a subsystem of a TGC system.

"branch" means an arrangement including any, but not necessarily all, of the following elements: a parser, input switch or switches; a converter; a transformer; output switch or switches; connected in series. A branch may be a subsystem of a power conversion topology.

"bank of converters system" means a power conversion system including a bank of converters topology and an associated controller.

"parser conversion system" means a power conversion system including a parser conversion topology and an associated controller.

"hybrid conversion system" means a power conversion system including a hybrid conversion topology with one or more branches, and an associated controller.

"system controller" means a computer, microcontroller, digital signal processor, embedded system, analog circuit or other implementation that performs monitoring functions and issues commands to various subsystems and/or components of a system, such as a TGC system. In addition, a system controller may also monitor an energy source and/or electrical load, and may provide information to an electrical load (for example, if the electrical load is an electric utility power grid).

"fluid flow-rate" means the quantity of fluid, such as air, water or steam, per unit time that moves through a turbine, measured in units such as cubic feet per minute, gallons per minute, liters per second, or kilograms per second.

"average-power" means the mean power as evaluated over one or more cycles of power delivery, for example as evaluated over a period of 16.67 milliseconds in a 60 Hz system.

"rated-power" or "name-plate power" means the highest value continuous average-power that a device (e.g. turbine, generator, converter, power conversion system, transformer, or TGC system) is specified to deliver.

"machine utilization" means the proportion of an electromagnetic machine, such as a multi-stage generator, not including the machine casing, that is active and delivering power when the machine is operating at rated-power, i.e. at the maximum continuous average-power capability of the machine. This proportion may be specified in various manners, including the ratio of the weight, e.g. in Kg, of the active portion of the machine to the weight of the machine not including the machine casing, or the ratio of the number of active induction elements to the total number of induction elements within the machine.

"maximum energy capture mode" means a mode of operation of a TGC system wherein, for a given fluid flow-rate through the turbine, the system controller delivers as much power as possible (i.e. the designed-maximum continuous average-power at that fluid flow-rate) from the energy source to the electrical load up to and including the rated-power of the TGC system. Maximum energy capture mode may also be referred to as "maximum power point tracking" (MPPT).

"throttling" means a mode of operation of a TGC system wherein the system controller limits and regulates the average-power delivered to the electrical load to a value less than that which may be delivered for a given flow-rate of fluid through the turbine. In practice, throttling of a TGC system may sometimes be necessary; however extended use of such a mode of operation may considerably reduce the energy capture over time of a given TGC system. Note that in maximum energy capture mode, the TGC system enters throttling mode when the system is operating at its rated-power.

"functional" means a component of a system that is capable of performing its intended function.

INTRODUCTION

A system controller may be used to automatically maintain the efficient conversion of power during operation of a multi-stage generator turbine/generator/converter system. The system controller may exist as a single controller which controls all functions of the turbine/generator/converter system, or may be separated into a number of sub-controllers with their own functions.

In some embodiments, a major function of the system controller is to control the turbine, such as monitoring and adjusting the pitch of the blades and the yaw of the turbine. A second major function of the system controller may be to monitor and control the power conversion electronics to provide an efficient and controlled transfer of power between the output of the multi-stage generator and the electrical load.

A system controller can be used to facilitate communication between components of the system; for example, in some embodiments it monitors sensors and/or receives information about system components and/or about the electrical load; it provides the relevant components with the necessary information to operate near-optimally and correctly; it instructs subsystems and components by providing adjustments and/or command signals. Inputs for the system controller may include, but are not restricted to, fluid speed; fluid direction; fluid statistical information; the position information and/or the derivatives of position information for casing or supporting structural elements; turbine position and/or speed and/or acceleration; blade pitch angle; turbine pitch and/or yaw; current, voltage, power, reactive power, distortion, measurements at various points within the system or of the electrical load; sensory or data information about characteristics of the electrical load. The system controller typically receives sensor and/or data information and issues commands to the turbine and components of the power conversion system to ensure the safe and efficient transfer of power from the turbine to the electrical load. For controlling the power conversion process of a multi-stage generator turbine/generator/converter system, the system controller may initiate and activate power generated from a stage, including the engagement, transfer, and disengagement of power through any given stage. The system controller preferably provides a smooth transfer of power between stages and an uninterrupted power flow to the electrical load, and when desirable may do so in such a way as to increase or maximize the energy capture from the fluid that is flowing through the turbine.

Bank of Converters System

In this document, the letters i, j, k, x, y and z will be used with reference numbers to refer to specific components referenced in the drawings. A reference number without a subscript may apply to any of the subscripted components sharing the same reference number.

Illustrated in FIG. 1 is a TGC system, which includes one embodiment of a power conversion topology, referred to here as a bank of converters topology $10x$. Bank of converters topology $10x$ has one or more converters 20 in different branches 30 that are each connected to a stage of induction elements within multi-stage generator $40x$.

Figure 2:
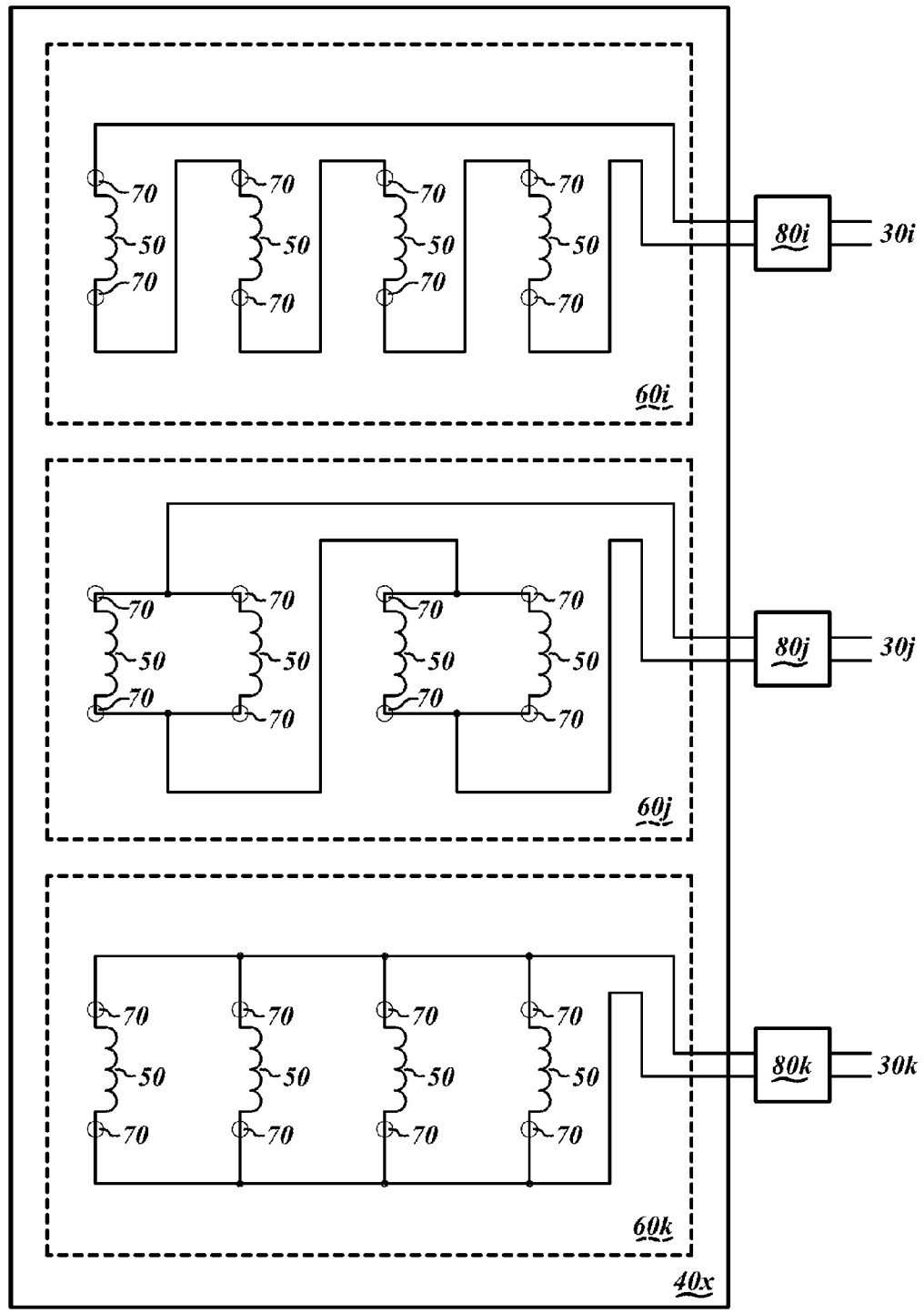
FIG. 2 is a block diagram of an embodiment of a multi-stage generator.

Shown in FIG. 2 is an illustration of multi-stage generator $40x$ that may be interfaced with bank of converters topology $10x$. Within multi-stage generator 40, such as $40x$, are a number of induction elements 50, which can be grouped into two or more different logical groupings referred to as stages 60, such as $60i$, $60j$, $60k$ in FIG. 2. A logical grouping means that the induction elements within a group 60, for example stage $60i$, share a common set of characteristics, primarily spatial locality, so that the generated voltage, amplitude and phase of a single induction element 50 will match those of other induction elements 50 within the grouping 60. Within one stage of a multi-stage generator 40, the possibility exists for single-phase, split-phase, 3-phase, 4-phase, 6-phase or other poly-phase arrangements of induction elements 50.

As illustrated in FIG. 2, induction elements 50 within a stage 60 may be hardwired and connected together into a combination of parallel and/or series connections. Induction element terminals 70 may be hardwired within the casing of multi-stage generator 40, or induction element terminals 70 may be hardwired external to the casing of multi-stage generator 40. Alternatively, no casing is needed and terminals 70 may be hardwired within multi-stage generator 40 or external to multi-stage generator 40. In general there may be any practical number of induction elements 50 within a stage 60, possibly in poly-phase arrangements, and a variety of series, parallel, or mixed series-parallel connections are possible; also there may be no hardwiring of induction elements 50.

The output terminal-block 80 from each stage 60 may connect to a branch 30, which may include input switch 90, converter 20, optional transformer 100, and output switch 110, all connected in series. The outputs of each branch 30 may be connected to electrical load 120. Each input switch 90, such as $90i$, includes several poles of switches, which may close or open simultaneously, to accommodate the terminals of a terminal-block 80, such as $80i$, for a given stage 60, such as $60i$, of a multi-stage generator 40. Each output switch 110, such as $110i$, includes several poles of switches, which may close or open simultaneously, to accommodate the terminals of electrical load 120.

For bank of converters topology $10x$, the power rating of converter 20 and/or transformer 100 may increase geometrically from one stage to the next, so that if at the first stage $60i$ a relatively low power converter $20i$ is required, the next stage $60j$ may require a significantly higher power converter $20j$, etc. For multi-stage generator $40x$, this allows for stage $60j$ to contain many more induction elements 50 than that of stage $60i$, and similarly stage $60k$ may have many more induction elements than stage $60j$, etc.

Turbine 130, acting as a prime mover, may be directly connected to a multi-stage generator 40 or there may be a ring-gear or gearbox 140 coupling turbine 130 to multi-stage generator 40. Turbine 130, as the prime mover, engages multi-stage generator 40 thereby inducing a voltage across induction elements 50.

Components and/or subsystems of the TGC system may be interfaced to a system controller 150, such as $150x$, including but not limited to the following components: turbine 130, induction elements 50, branches 30, input switches 90, converters 20, transformers 100, output switches 110, and electrical load 120. Among other turbine related tasks, system controller 150 may provide commands to control the pitch of the turbine blades. System controller 150 may also monitor the fluid medium, for example sensing the speed of the fluid at various possible locations in and around the turbine. System controller 150 may also monitor the rotational speed of turbine 130 and/or of multi-stage generator 40. System controller 150 may also monitor power variables at various points in the TGC system. System controller 150 may also monitor various current, voltage, phase angle, power or other variables of electrical load 120 and may also provide information to electrical load 120. System controller 150, or a dedicated sub-controller (not shown), may also synchronize the output voltage or current of branch 30 with the voltage waveform of electrical load 120, which may be an electric utility power grid.

To accommodate the entire or near-entire range of output power that multi-stage generator 40 may be capable of producing, multiple converters 20 and/or transformers 100 may be used in a TGC system. For bank of converters topology $10x$, these multiple converters 20 and/or transformers 100 are arranged so that power flows, with reasonably high efficiency, through one branch 30 corresponding to a given power level range that may be generated by a given stage 60 of multi-stage generator $40x$, (except during a transition period when power is being transferred from one branch to another branch, such as from $30i$ to $30j$). There may be a slight overlap in the power level ranges for stages 60 of multi-stage generator $40x$. For example, the top value of the power range for stage $60i$ may be a small percentage higher than the lowest value of the power range for stage $60j$. Similarly, and correspondingly, there may be a slight overlap in the power level ranges for branches 30 of bank of converters $10x$. For example, the top value of the power range for branch $30i$ may be a small percentage higher than the lowest value of the power range for branch $30j$. The overlap of power ranges aids system controller 150 to effect a smooth transfer of power flow from one stage (branch) to the next stage (branch) as the power level of the prime mover, i.e. the turbine, varies with time.

Input switch 90, such as $90i$, may be connected to a corresponding converter 20, such as $20i$, and used by system controller 150 to select a branch 30, such as $30i$, which may then be activated by system controller 150 and then transform power from a multi-stage generator 40 (alternatively power switching devices within converter 20 may serve a similar purpose so that input switches 90 are not needed). An output switch 110, such as $100i$, may be opened to prevent excitation of a transformer 100, such as $110i$, within an inactive branch, such as $30i$. Output switches 110 also act as a fail-safe to prevent power being delivered to electrical load 120 from inactive converter branches 30, and may facilitate the transfer of power from one branch 30 to another branch 30, and provide additional isolation (with manually operated circuit breakers) for maintenance purposes.

Figure 3:
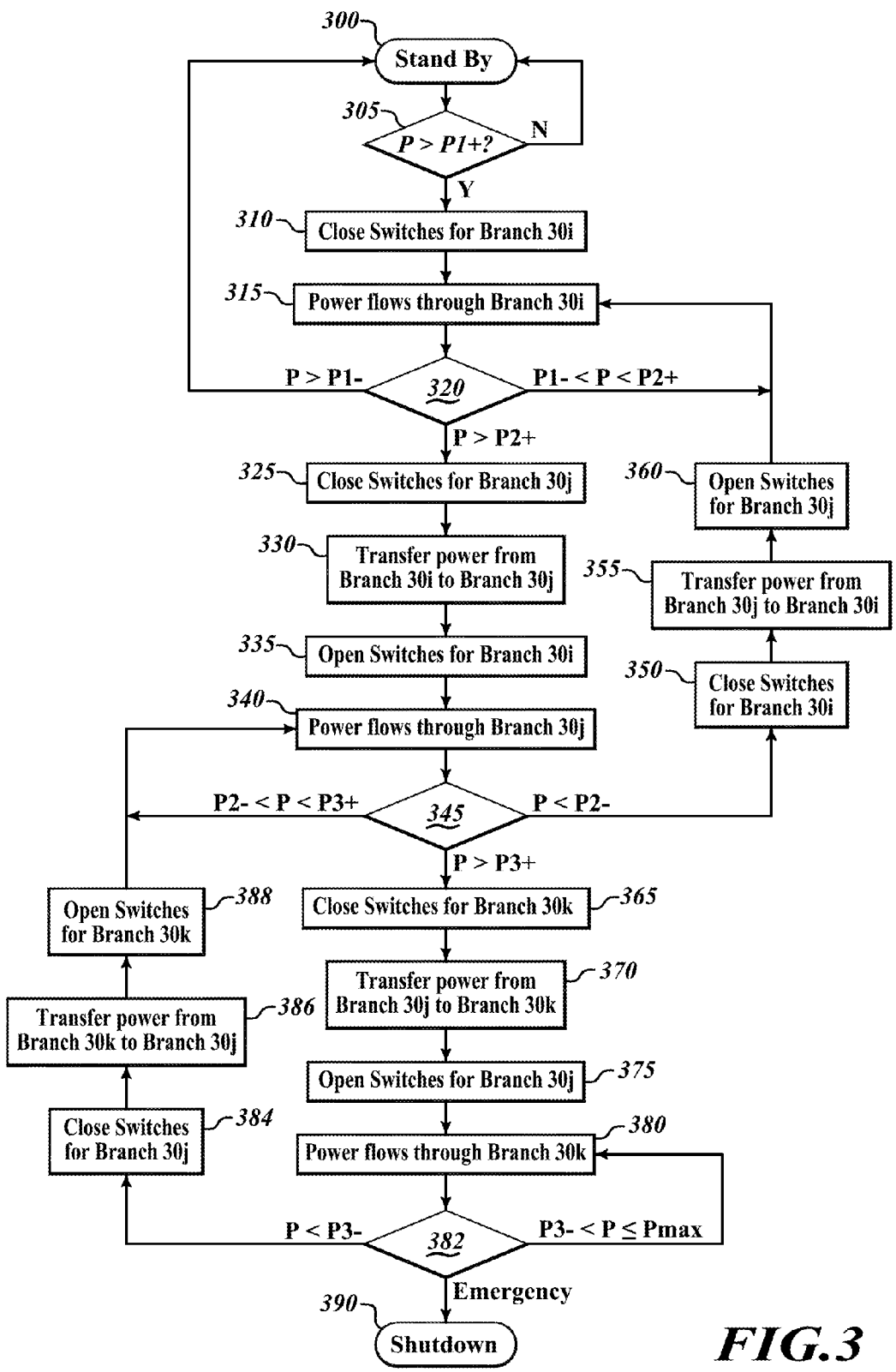
FIG. 3 is a flowchart showing an example of a control process by which a bank of converters converts the electric power into a useable form.

Referring to the flowchart of FIG. 3, system controller 150, and/or a delegated sub-controller, may perform the monitoring of variables, such as, but not restricted to, the monitoring of power flow from a multi-stage generator 40 (multi-stage generator 40 power output may also be obtained by measurement of the input power to power conversion topology 10). System controller 150 also makes decisions and executes tasks, using a control process outlined in the flowcharts, such as illustrated in FIG. 3. The control process that is used generally seeks to maximize energy capture mode when, for a given fluid flow-rate, it is desirable to deliver as much power as possible from the energy source to electrical load 120, up to and including the rated-power of the TGC system. A variation of the maximum energy capture mode of operation is a throttling mode wherein a system controller 150 is instructed by an operator (which may be a person or another controller, for example a controller that governs operation of a wind farm) to deliver a limited and/or regulated average-power to electrical load 120 that may be less than the rated-power of the TGC system. Even in maximum energy capture mode, once the rated-power delivery of the TGC system is obtained, system controller 150 may enter a throttling mode wherein the average output power of the TGC system is regulated to be the rated-power of the TGC system, and multi-stage generator 40 is operating at its rated-power level.

FIG. 3 is a flowchart showing an embodiment of a control process by which system controller 150x may control bank of converters topology 10x to transform the electric power produced by multi-stage generator 10x into a useable form for electrical load 120. The bank of converters system may be in a standby mode (step 300) when there is no power output from the multi-stage generator 40x. In standby mode all branches 30 may be disconnected from electrical load 120, i.e. input switches 90 may all be open and output switches 110 may be all open.

Under control of system controller 150, voltage may be induced in induction elements 50 if there is sufficient fluid flow of an energy source in turbine 130 to rotate of the shaft of multi-stage generator 40. A power conversion topology 10, such as bank of converters topology 10x, remains inactive and in standby mode (step 300) until multi-stage generator 40 produces power exceeding a pre-defined threshold level, defined herein as "P1+" (step 305), where P1+ is generally a small percentage greater than the minimum operating input power of power conversion topology 10, defined herein as "P1−". At this point, referring to the bank of converters system and conversion topology 10x, switch 90i, connected to the lowest level stage 60i, may close and under control of system controller 150x branch 30i becomes active, including converter 20i and/or transformer 100i, but no power is yet flowing to electrical load 120. It may be desirable at this time to control the voltage at the output of converter 20i or the output voltage of transformer 100i such that the voltage is in the correct form for electrical load 120, at which time output switch 110i may be closed (step 310) (it is also possible to close switch 90i after closing switch 110i) thereby connecting transformer 100i to electrical load 120, and then power is delivered, under control of system controller 150x, from stage 60i of multi-stage generator 40x though the lowest power-range converter 20i of branch 30i to electrical load 120 (step 315). At this point a single converter branch 30i is active and transforming power, meaning that converter 20i and transformer 100i have power flowing through them.

In general for the illustrated bank of converters system embodiment, if the power level for the currently active converter branch 30 decreases past a certain level (which, referring to the "−" notation, may be slightly less than the threshold necessary to begin power flow in that branch), then the flow of power is transferred to the preceding branch. If there is no previous branch then the bank of converters topology 10x and system controller 150x return to standby mode. Likewise, if the power level for the currently active converter branch 30 increases past a certain level (referring to the "+" notation), then flow of power is transferred to the next branch having a higher power rating (for example branch 30j may be capable of transforming power at higher levels than branch 30i). If there is no next branch then the TGC system is operating at its rated-power level, and a multi-stage generator 40, such as 40x, is delivering its rated-power defined herein as "$P_{max}$" where $P_{max}$ is the rated-power of a multi-stage generator 40, such as 40x, corresponding to and slightly greater than the rated-power of the TGC system, due to losses in power conversion topology 10.

For example, referring again to FIG. 3, as power flows through branch 30i (step 315), system controller 150X monitors the output power level of multi-stage generator 40x (step 320), and if the power level drops below P1−, the system returns to standby mode (step 300), meaning that power flow in branch 30i is reduced to zero by system controller 150x and then switches 110i and 90i are opened, preferably in that order. Note that system controller 150x may return the system to standby from other steps, such as, but not restricted to, steps 345 or 382.

If (at step 320) the power level is between P1− and P2+, then system controller 150x retains the power flow through branch 30i (step 315). If (at step 320) the power level exceeds P2+, then the switches for the next branch 30, branch 30j, switches 90j and 110j, are closed, preferably, but not necessarily, in that order (step 325). Power flow is then transferred by system controller 150x to branch 30j (step 330), and at least one of switches 110i and 90i are opened (step 335), and power flows only through branch 30j (step 340).

As power flows through branch 30j (step 340), system controller 150x monitors the output power level of multi-stage generator 40x (step 345), and if the power level is between P2− and P3+, then the system controller 150x retains the power flow through branch 30j (step 340).

If (at step 345) the power level drops below P2−, then system controller 150x returns power flow in bank of converters topology 10x to branch 30i, possibly using the following sequence of steps. Switches 90i and 110i are closed (step 350), then system controller 150x causes power flow to transfer to branch 30i (step 355), after which switches 110j and 90j are opened (step 360).

If (at step 345) the power level exceeds P3+, then switches 90k and 110k are closed (step 365), and power is transferred by system controller 150x from branch 30j to branch 30k (step 370), following which switches 110j and 90j are opened (step 375) so that the transfer of power from branch 30j to branch 30k is complete and power flows only though branch 30k (step 380).

As power flows through branch 30k (step 380), system controller 150x monitors the output power level of multi-stage generator 40x (step 382), and if the power level is between P3− and $P_{max}$, then system controller 150x retains the power flow through branch 30k (step 380). Note that when power level $P_{max}$ is obtained system controller 150x may enter a throttling mode (also step 380). If (at step 382) the power level drops below P3−, system controller 150x returns power flow in bank of converters topology 10x to branch 30j possibly using the following sequence of steps. Switches 90j and 110j are closed (step 384), then system controller 150x causes power flow to transfer to branch 30j (step 386), after which switches 110k and 90k are opened (step 388).

If (at step 382), or at other steps including, but not restricted to, steps 320 and 345, an emergency condition arises (for example a storm or hurricane winds applied to a wind turbine), it may be necessary for system controller 150x to shut down operation of the TGC system by setting power flow through the TGC system to zero and preferably stopping rotation of turbine 130 (step 390).

If the fluid flow-rate in turbine 130 exceeds a threshold value, herein designated "$f_{max}$", corresponding to the power rating $P_{max}$, and possibly also corresponding to a specific speed of the fluid at some point in or around the turbine, system controller 150 then enters a throttling mode and regulates the power flow through the TGC system to be at the maximum level of $P_{max}$ (hence the "≤" condition in the monitoring and decision step 382 of FIG. 3, where for fluid flow-rate greater than $f_{max}$, it may be desirable for system controller 150 to operate the TGC system with power from multi-stage generator 40 at a constant average power of $P=P_{max}$; aside from inefficiency in power conversion topology 10 a power of approximately $P_{max}$ would in this case be delivered to electrical load 120, as implied by the loop from step 382 to step 380). If the fluid flow-rate continues to increase to or beyond a second threshold value, herein designated "$f_{excess}$" (possibly corresponding to a specific speed of the fluid at some point in or around the turbine that may be measured by system controller 150, or possibly corresponding to a specific rotational speed of the shaft of turbine 130 or a specific shaft speed of multi-stage generator 40, any of which may be measured by system controller 150), then the fluid flow-rate may be excessive for turbine 130 to maintain its mechanical integrity. Such a situation is one example of an emergency condition, wherein it may be necessary for system controller 150 to shut down operation of the TGC system by setting power flow through the TGC system to zero and preferably stopping rotation of turbine 130 (step 390).

For the bank of converters embodiment, and for other embodiments, the activation or deactivation of a branch 30 may be initiated when a power threshold is crossed (e.g. for the bank of converters power conversion system there may be a transfer of power flow from branch 30i to branch 30j initiated when multi-stage generator 40x output power exceeds P2+). However, a system controller 150, such as 150x, may initiate the activation or deactivation of a branch 30 using system variables other than the power from a multi-stage generator 40, such as but not restricted to: the speed of fluid flowing in or around turbine 130; the rotational speed of turbine 130; the rotational speed of a multi-stage generator 40; the output voltage of stages 60 as measured at a terminal-block 80 or directly across one or more induction elements 50 of multi-stage generator 40; and/or the input voltage to a power conversion topology 10. For example, in a power throttling mode, when it is desirable to control the power delivered by the TGC system to electrical load 120 to be at a level less than the maximum possible for a given fluid flow-rate, the transfer of power from one branch 30 to the next branch 30 (or addition or removal of a branch 30 for the embodiments discussed below) may be initiated when the voltage output from a given stage exceeds (or drops below) a voltage threshold (e.g. for the bank of converters power conversion system there may be a transfer of power flow from branch 30i to branch 30j when the output voltage of stage 60i exceeds a voltage threshold defined herein as "V2+", following which stage 60i could be inactivated). Such operation by the system controller 150 would maintain the voltage input to each converter within a specified range and thus prevent damage to, or maintain high efficiency operation of, the converters 20 and transformers 100 of the power conversion topology 10.

The above discussed principles of operation for the bank of converters system may be extended (or simplified) in the case where there are more than (or fewer than) three branches 30. In general, there may be any practical number of branches 30 within a power conversion topology 10, such as bank of converters topology 10x.

Parser Conversion System

The above discussed embodiment of a power conversion system, a bank of converters system, has an elegance of process control as only one stage 60 and one corresponding branch 30 is active at a given time, aside from periods when power is being transferred from one branch 30 to another branch 30. However, at the highest power level, $P_{max}$, there are unused inactive stages 60 within the multi-stage generator 40. For the above-described bank of converters embodiment, the highest power stage 60, which may be stage 60k as in FIG. 2, may contain the largest number of induction elements 50 compared to other stages, at the TGC system rated-power (corresponding to power $P_{max}$ delivered by multi-stage generator 40x) machine utilization of multi-stage generator 40x may be less than 100%, for example on the order of 75% at a rated-power on the order of one megawatt to ten megawatts, meaning that 75% of induction elements 50 within multi-stage generator 40x are activated and 25% are inactive when the TGC system is operating at its rated-power level (when multi-stage generator 40x is operating at its rated-power level $P_{max}$).

Figure 4:
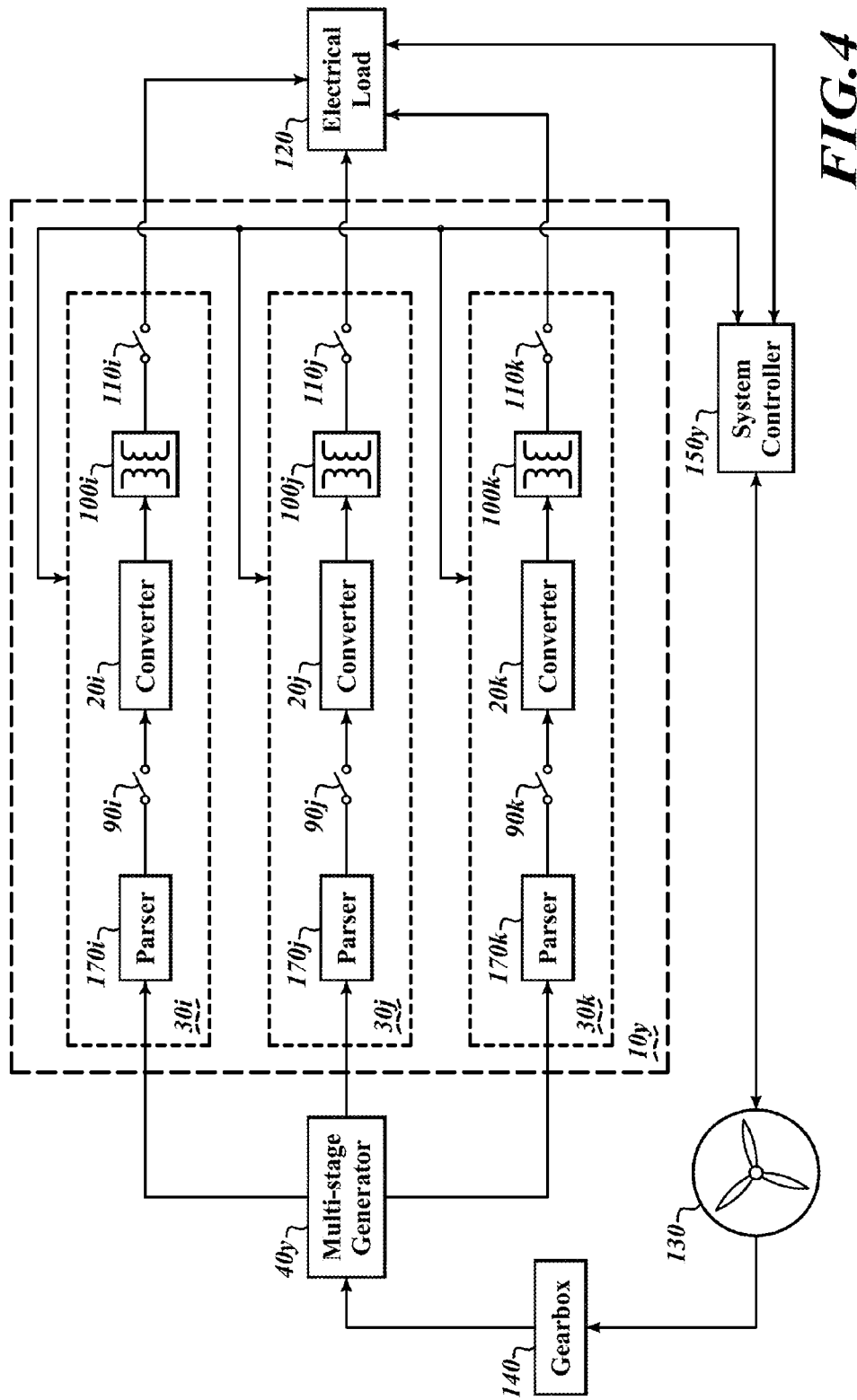
FIG. 4 is a block diagram of an alternative embodiment of a turbine/generator/converter system including a parser conversion topology.
Figure 5:
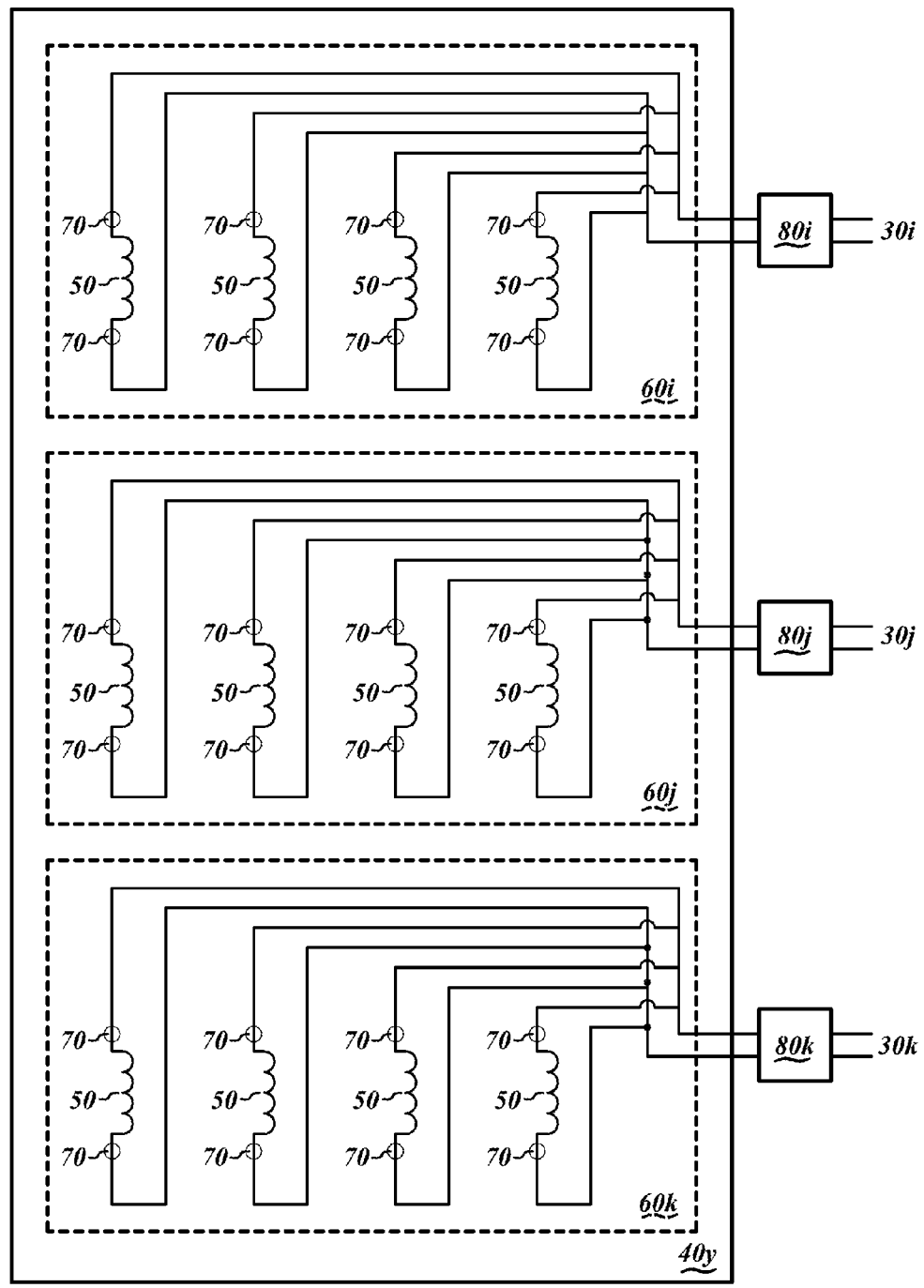
FIG. 5 is a block diagram of an alternative embodiment of a multi-stage generator illustrating induction elements that may not need to be hardwired for interface to a parser conversion topology.
Figure 6A:
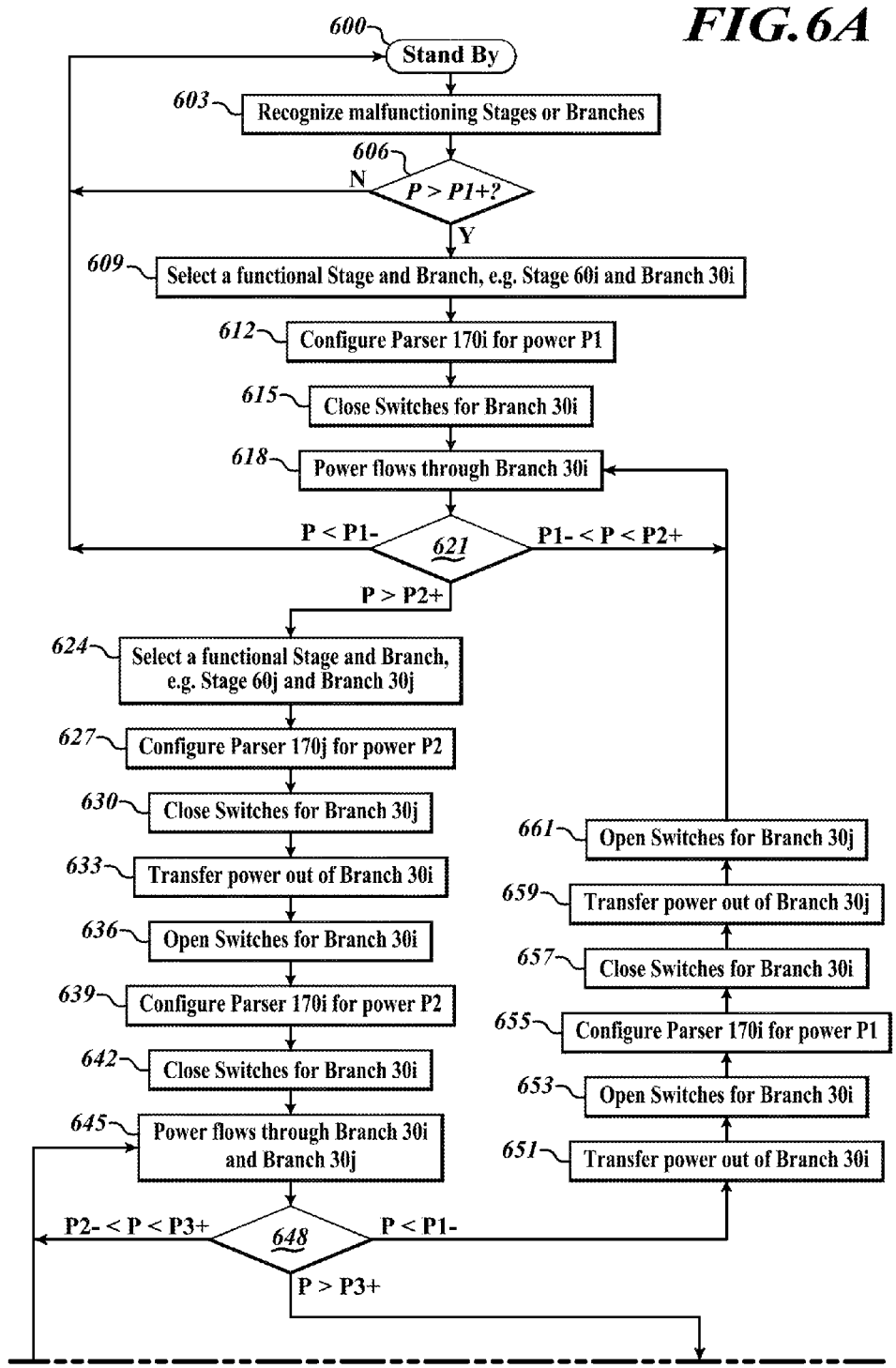
FIGS. 6A and 6B are a flowchart showing an example of a control process by which a parser conversion system converts electric power into a useable form.
Figure 6B:
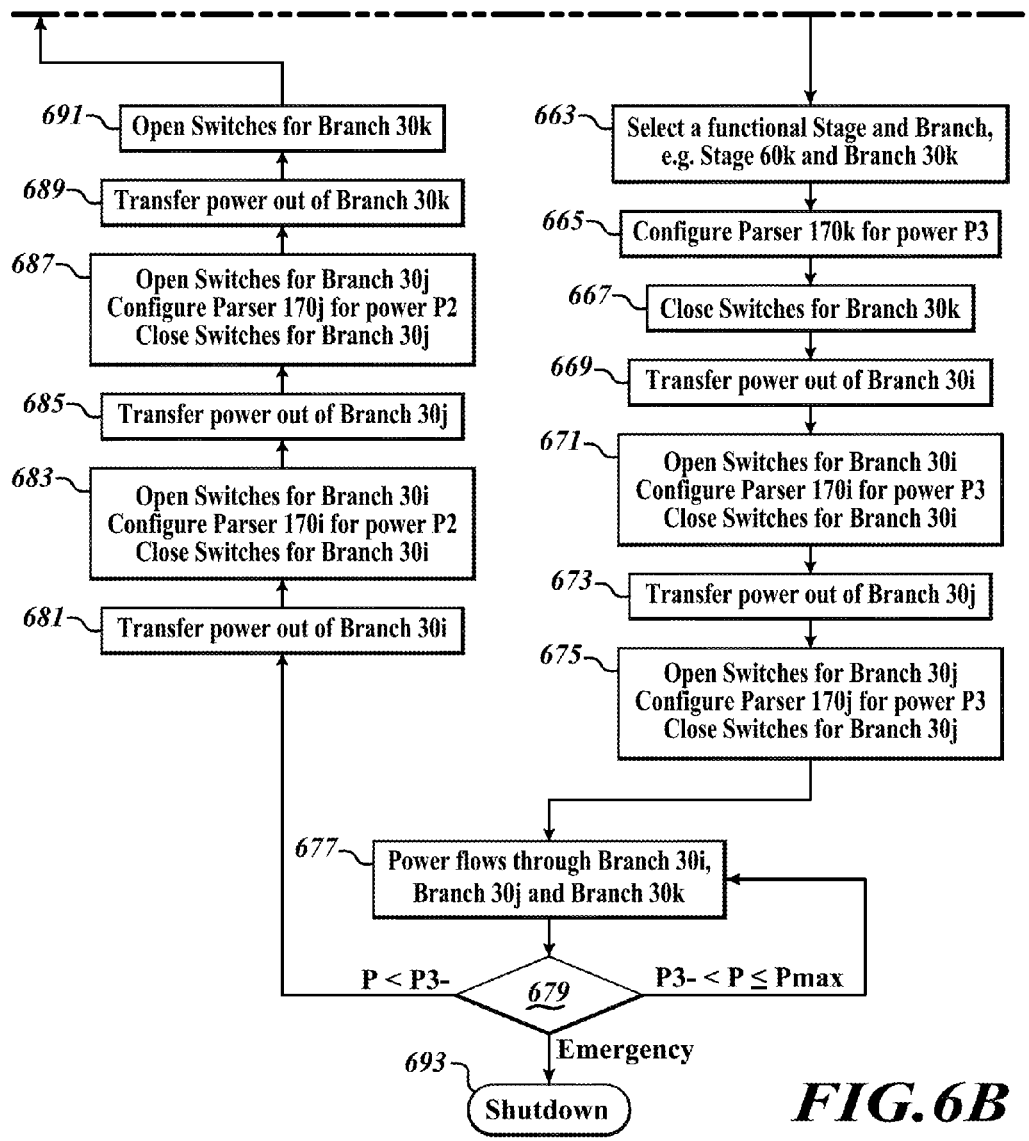

Another embodiment of a power conversion system, which may have up to 100% machine utilization of a multi-stage generator 40 is referred to herein as a parser conversion system, and includes parser conversion topology 10y and its associated controller, system controller 150y, as shown in FIG. 4. An illustration of a multi-stage generator 40y which may be interfaced with parser conversion topology 10y is shown in FIG. 5. For this embodiment, multi-stage generator 40y may require no hardwiring of induction elements 50, i.e., all induction element terminals 70 within a stage 60, such as 60i, are connected to terminal-block 80, such as 80i, as indicated in FIG. 5. A corresponding process control flowchart that could be employed by system controller 150y in the control of parser conversion topology 10y is shown in FIG. 6.

As seen in FIG. 4 parser conversion topology 10y includes one or more branches 30. In FIG. 4, three branches i, j, and k, are represented, although any practical number of branches may be present. Each branch 30 may include a parser 170, an input switch 90, a converter 20, an optional transformer 100, and an output switch 110, all connected in series. The output switch 110 from each branch 30 is connected to electrical load 120, which may be an electric utility power grid. A key concept of the parser conversion topology 10y, is the modular design, in that each branch 30 may be substantially identical in form with all other branches, i.e. all of the parsers 170i, 170j, 170k (as shown in FIG. 4) may be substantially identical, as may be input switches 90i, 90j, 90k, converters 20i, 20j, 20k, transformers 100i, 100j, 100k, and output switches 110i, 110j, 110k.

FIG. 5 shows a multi-stage generator 40y which may have any practical number of stages 60, each of which may be substantially identical, each stage 60 including a number of induction elements 50. Thus multi-stage generator 40y may also have a modular design. The modularity of parser conversion topology 10y and of the multi-stage generator 40y enables one stage-branch pair to function in place of a second stage-branch pair should the latter be damaged. For example if stage 60i is damaged (and multi-stage generator 40y is otherwise intact) or if branch 30i is damaged, then stage 60j and branch 30j may provide power flow to electrical load 120 in place of stage 60i and branch 30i, as decided by system controller 150y, after the performance of diagnostic tests to determine the functionality of stages 60 and branches 30. Such replacement of damaged stages 60 and/or branches 30 is facilitated by input switches 90 and output switches 110, permitting normal TGC system operation or a reduction in TGC system operation until repairs are affected. In the above example, input switch 90*i* and output switch 110*i* may both be kept open isolating the damaged component from electrical load 120, or in the specific case of a damaged stage 60, isolating that stage 60 from its branch 30 of parser conversion topology 10*y*.

For the illustrated parser conversion system embodiment, assuming no damaged stages 60 or branches 30, as the power level of turbine 130 increases, more stage-branch pairs may be activated, until the rated-power condition is obtained, and the power output of multi-stage generator 40*y* may be $P_{max}$ and all stages 60 of multi-stage generator 40*y* may be active and correspondingly all branches 30 of parser conversion topology 10*y* may be active, thus achieving 100% utilization of multi-stage generator 40*y*.

The output from each stage 60 of the multi-stage generator 40*y* is connected through terminal-block 80 to the input for parser 170. Parsers 170 are used to configure the terminals 70 of the induction elements 50 such that the voltage outputs for parser 170 are within an acceptable level for the corresponding converter 20 in branch 30. For example, at a low power level range (for example from P1− to P2+) perhaps one or more sets of induction elements 50 within an active stage 60, such as 60*i*, are connected in series by parser 170. At the next higher power level range (for example from P2− to P3+), when the voltage across each individual induction element 50 has increased in response to increased rotational speed of turbine 130, a mix of series and parallel connections of induction elements 50 may be arranged by parser 170. The process continues until multi-stage generator 40*y* is operating at the maximum continuous average-power of $P_{max}$ in which case there may be one or more sets of induction elements 50 within all stages 60 that are connected in parallel. By doing so, it is possible to keep the variation of input voltage to converter 20 to within a reasonable range and permitting more efficient operation of converter 20 and its associated transformer 100, such as converter 20*i* and its associated transformer 100*i*.

Parser 170 may be used to arrange induction elements 50 within a stage 60 to meet the voltage requirements of a corresponding converter 20 as needed. If a higher voltage level is required by converter 20 then parser 170 arranges the induction elements 50 in a more series-like manner; likewise if a lower voltage level is required then induction elements 50 are arranged in a more parallel-like manner. The configuration of each parser 170 is a function of system controller 150*y*, responding to changing variables such as fluid speed or turbine 30 rotational speed, or generator 40 rotational speed, or direct measurement of voltages at terminal block 80.

FIG. 6 is a flowchart showing an embodiment of a control process by which system controller 150*y* may control parser conversion topology 10*y* to transform the electric power produced by multi-stage generator 10*y* into a useable form for electrical load 120. System controller 150*y*, or a delegated sub-controller, makes decisions and executes tasks as outlined in the flowchart shown in FIG. 6. The illustrated control process generally seeks maximum energy capture mode and includes throttling of parser conversion topology 10*y* when multi-stage generator 40*y* is delivering its rated-power of $P_{max}$ to parser conversion topology 10*y*.

As seen in FIG. 6, the parser conversion system may be in a standby mode (step 600) when there is no power output from multi-stage generator 40*y*. In standby mode all branches 30 of parser conversion topology 10*y* are disconnected from electrical load 120, i.e., input switches 90 and output switches 110 are open, and parsers 170 may be pre-configured for a parallel-like arrangement of induction elements 50 (this is a fail-safe configuration that prevents excess voltage application to converters 20 in the event of accidental closing of input switch 90).

An internal diagnostic system check may be performed by a system controller 150, such as 150*y*, to determine if any of the induction elements 50 or branches 30 in the TGC system is malfunctioning (step 603). If a malfunctioning induction element 50 or malfunctioning branch 30 is found then it is disabled, by keeping open at all times the associated input switch 90 and output switch 110 (until a suitable time can be found for repair of the malfunctioning part).

Under control of a system controller 150, such as 150*y*, voltage may be induced in induction elements 50 if there is sufficient fluid flow in turbine 130 to rotate of the shaft of multi-stage generator 40. System controller 150*y* maintains all branch output switches 110 in an open state (steps 600 and 603) until a multi-stage generator 40, such as 40*y*, is capable of producing power exceeding a pre-defined threshold level, P1+ (step 606), when a functional branch 30, for example branch 30*i*, may be selected (step 609) by system controller 150*y* and the corresponding parser 170*i* is configured for the lowest power level P1, i.e. parser 170*i* is configured for power level range P1− to P2+ (step 612). This typically means that parser 170*i* may connect one or more sets of induction elements 50 within stage 60*i* in a series-like arrangement since at low power it is likely that the voltage across individual induction elements is relatively low and placing the elements 50 in series increases the voltage applied to converter 20*i*. The corresponding input and output switches 90*i* and 110*i* may then be closed, preferably in that order (step 615) and power begins to flow from multi-stage generator 40*y* though the stage 60*i* and branch 30*i* to electrical load 120 (step 618).

As power flows through branch 30*i* (step 618), system controller 150*y* monitors the output power level of multi-stage generator 40*y* (step 621), and if the power level is between P1− and P2+, then system controller 150*y* retains the power flow through branch 30*i* (step 618).

If (at step 621) the power level drops below P1−, the system returns to standby mode (step 600), meaning that power flow in branch 30*i* may be reduced to zero, and switches 110*i* and 90*i*, may be opened, preferably in that order. Note that in general it may be possible for system controller 150*y* to return the system to standby from other steps such as but not restricted to steps 648 or 679.

If (at step 621) the power level exceeds P2+, another functional branch that is not currently active, for example branch 30*j*, is selected (step 624) and its parser 170*j* configured for power level range P2− to P3+ (step 627). Then switches 90*j* and 110*j* may be closed (step 630). Power flow may be transferred out of branch 30*i* by system controller 150*y* to branch 30*j* (step 633) temporarily, so that switches 110*i* and 90*i* may be opened if necessary (step 636), and system controller 150*y* may now configure parser 170*i* for the next higher power range P2− to P3+ (step 639). Input and output switches 90*j* and 110*j* may be then closed (step 642), and power is controlled by system controller 150*y* to flow though both branches 30*i* and 30*j* (step 645). The above steps (and those discussed below) may be performed by system controller 150, such as 150*y*, in such a way that there is no interruption of power delivery to electrical load 120.

As power flows through branches 30*i* and 30*j* (step 645), system controller 150*y* monitors the output power level of multi-stage generator 40*y* (step 648), and if the power level is between P2− and P3+, then the system controller 150*y* retains the power flow through branches 30*i* and 30*j* (step 645).

If (at step 648) the power level drops below P2−, the controller returns power flow in parser conversion topology 10*y* to branch 30i possibly using the following sequence of steps. All power is transferred temporarily from branch 30i to 30j (step 651). Switches 110i and 90i are opened (step 653). Parser 170i is reconfigured for power level range P1– to P2+ (step 655). Switches 90i and 110i are closed (step 657). All power is transferred from branch 30j to 30i (step 659). Switches 110j and 90j are opened (step 661), and power now flows through branch 30i (step 618).

If (at step 648) the power level exceeds P3+, another functional branch, for example branch 30k, may be selected (step 663) and parser 170k configured for power level range P3– to $P_{max}$ (step 665). Then switches 90k and 110k are closed (step 667). All power flow in branch 30i is transferred out of branch 30i and into branch 30j (step 669) temporarily, so that switches 110i and 90i are opened if necessary (step 671), and system controller 150y now configures parser 170i for the next higher power range P3– to $P_{max}$ (step 671). Input and output switches 90i and 110i are then be closed (step 671), and the power flowing in branch 30j is now temporarily transferred from branch 30j to 30i (step 673), so that switches 110j and 90j may be opened (step 675), and system controller 150y now configures parser 170j for the next higher power range P3– to $P_{max}$ (step 675). Input and output switches 90i and 110i may then be closed (step 675), and after transferring some power to branch 30j (from either or both of branches 30i and 30k), power is controlled by system controller 150y to flow though all branches, such as branches 30i, 30j, and 30k (step 677).

As power flows through branches 30i, 30j, and 30k (step 677), system controller 150y monitors the output power level of multi-stage generator 40y (step 679), and if the power level is between P3– and $P_{max}$, then system controller 150y retains the power flow through all branches, such as branches 30i, 30j, and 30k (step 677). Note that $P_{max}$ is the rated-power of multi-stage generator 40y, and hence system controller 150y may enter throttling mode when this power level is achieved.

If (at step 679) the power level drops below P3–, system controller 150y returns power flow in parser conversion topology 10y to branches 30i and 30j (i.e., deactivating branch 30k) possibly using the following sequence of steps. All power is transferred temporarily from branch 30i to branches 30j and 30k (preferably with equal power levels in branches 30j and 30k) (step 681). With no power in branch 30i, switches 90i and 110i are opened if necessary (step 683) and parser 170i reconfigured for power level range P2– to P3+ (step 683). Switches 90i and 110i are then closed (step 683). All power in branch 30j is then transferred from branch 30j to branch 30i (step 685). With no power in branch 30j, switches 90j and 110j are opened if necessary (step 687) and parser 170j reconfigured for power level range P2– to P3+ (step 687). Switches 90j and 110j are then closed (step 687). Power may then be transferred out of branch 30k, possibly to branch 30j (step 689), so that power flow in branches 30i and 30j is approximately equal and switches 110k and 90k are opened (step 691), and power now flows through branches 30i and 30j (step 645).

If (at step 679) or for that matter at other steps, including but not restricted to steps 621 and 648, an emergency condition arises, it may be necessary for system controller 150y to shut down operation of the TGC system by setting power flow through the TGC system to zero and preferably stopping rotation of turbine 130 (step 693).

For the illustrated parser conversion system embodiment, the activation or deactivation of a branch may be initiated when a power threshold is crossed, however, system controller 150y may alternatively initiate the activation or deactivation of a branch 30 using other system variables such as, but not restricted to: the speed of fluid flowing in or around turbine 130; the rotational speed of turbine 130; the rotational speed of a multi-stage generator 40y; the output voltage of stages 60 as may be measured at a terminal-block 80 or directly across one or more induction elements 50 of a multi-stage generator 40; and/or the input voltage to parser conversion topology 10y.

The above discussed principles of operation for a parser conversion system may be extended (or simplified) to the case where there are more than (or fewer than) three branches. In general, there may be any practical number of branches 30 within a parser conversion topology 10y.

Alternative Parser Conversion System and its Variations

Figure 10:
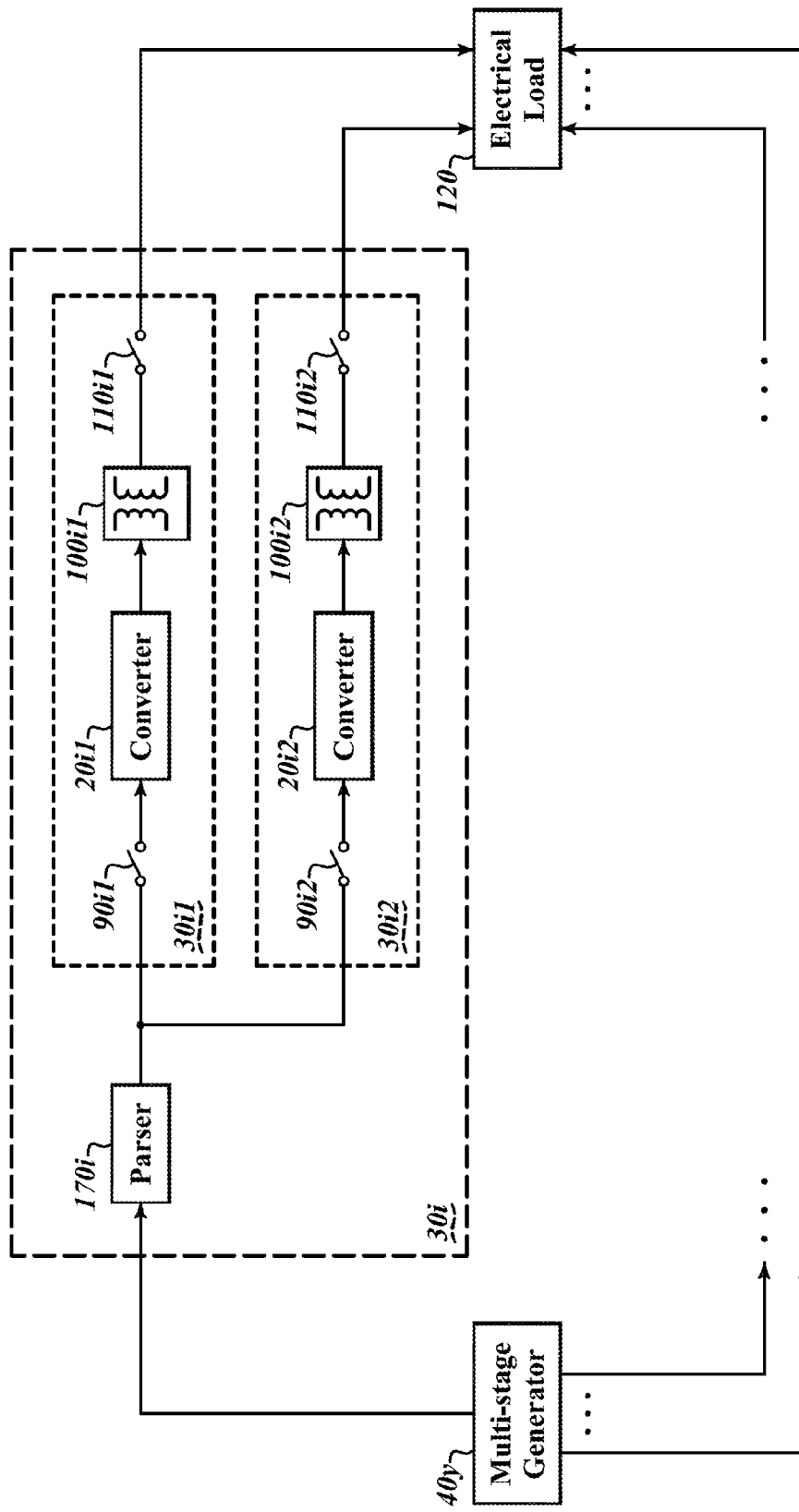
FIG. 10 is a block diagram of an embodiment of a branch having a fork to allow selection of a converter.

An issue with a parser conversion system is that at a low power level (at or near P1 for example), it may be difficult to maintain high efficiency of the one branch 30 in operation. At a loss of some modularity, this issue may be remedied by allowing one branch 30 to fork into two sub-branches, each sub-branch having a converter and/or an optional transformer. Thus, at low power operation (at or near P1 for example), the sub-branch with the lowest power rating, which has been designed for high efficiency at that lower power level, may be the only branch activated. In this embodiment, one stage, such as stage 60i, could have two branches, branch 30i1 and branch 30i2, as shown in FIG. 10, with the provision that branch 30i2 may have a higher rated-power specification than that of branch 30i1. It may be reasonable to set the rated-power of branch 30i2 to be equal to the remaining branches 30, such as branch 30j, branch 30k etc, which are configured as shown in FIG. 4. By having a designated low power branch fork into two or more sub-branches, as shown in FIG. 10, it may be possible to employ less complex parsers for the remaining branches, i.e., parsers 170j, 170k, etc., may have a simpler structure than parser 170i.

Figure 11:
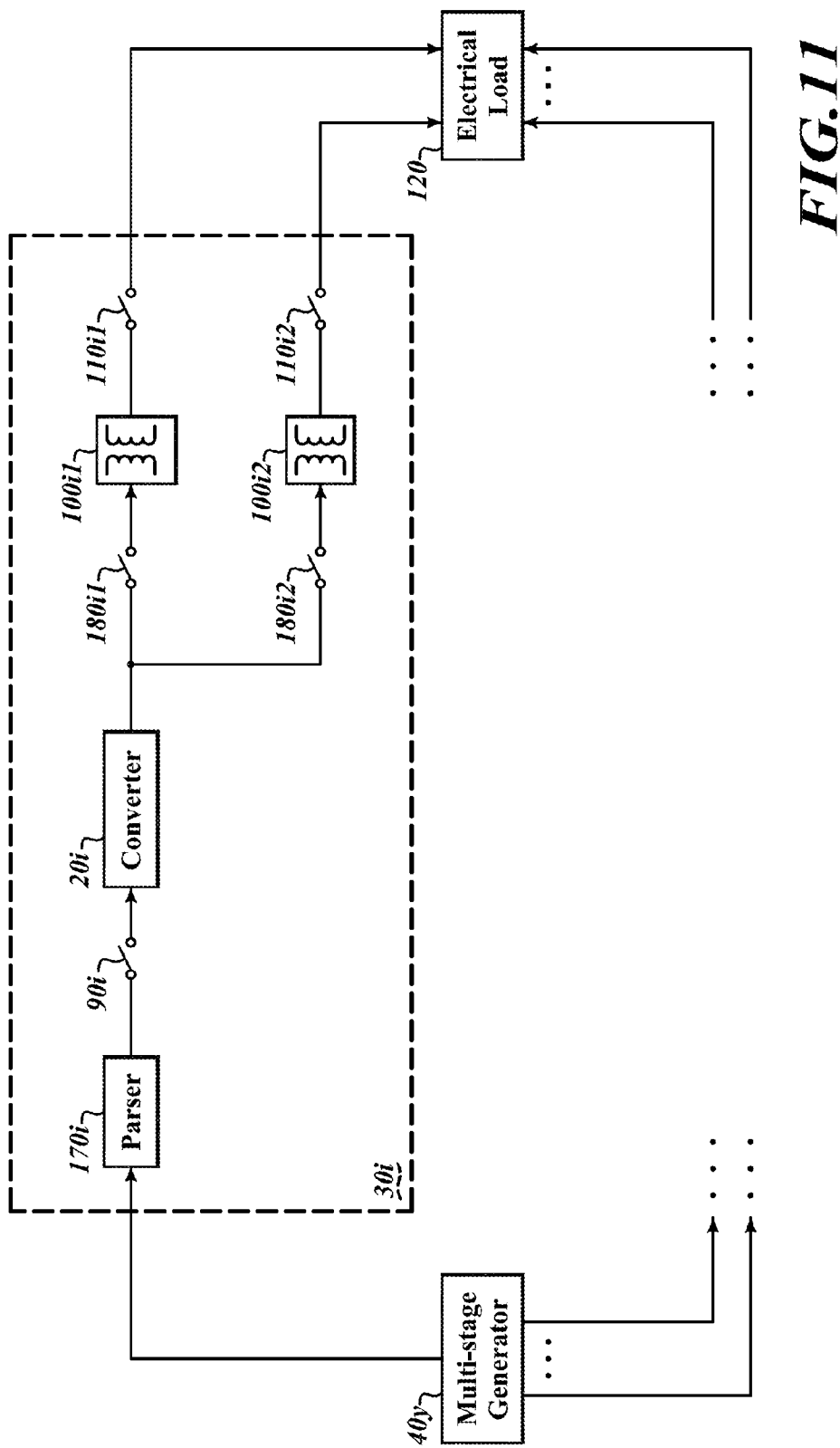
FIG. 11 is a block diagram of an alternative embodiment of a branch, wherein the branch has a fork to allow selection of a transformer.

A variation of this embodiment is that the forking of a branch 30 may take place at the output of the converter. For example, as seen in FIG. 11, branch 30i could have input switch 90i followed by (i.e. in series with) converter 20i, following which is the fork with optional multi-pole switch 180i1 in a fork prong connected to lower power transformer 100i1, and optional multi-pole switch 180i2 connected to higher power transformer 100i2 on the other prong.

Another variation in the forking embodiment is that there may be three or more sub-branches, for example 30i1, 30i2, 30i3, etc., or in the case of the fork taking place following a converter, three or more sub-transformers, for example 100i1, 100i2, 100i3, etc. Also, there is the possibility that more than one stage 60 may employ forked branches or forked transformers.

Hybrid Conversion System

The above discussed embodiment of a parser conversion system, and its forked-branch variations, has the advantage of permitting the design of a multi-stage generator 40, such as 40y, that has almost, if not all, 100% machine utilization at rated power. However the design of parser 170 for some or all of stages 60 may require a large number of switches within the parser, and this may add to the construction cost of parser conversion topology 10y, and may also reduce the reliability of the parser conversion system.

The hybrid power conversion system discussed below is an embodiment of a power conversion system for a turbine driven multi-stage electrical generator. With this embodiment, very high machine utilization may be achievable for a multi-stage generator 40, and with significantly simplified parsers 190 (as seen in FIG. 7) by comparison to parsers 170 of the parser conversion system.

The complexity of a parser 190 may be significantly less than that of a parser 170 because each parser 190 may need only arrange sets of partially hardwired induction elements 50 in perhaps just two or three possible arrangements (each arrangement corresponding to a power range of multi-stage generator 40z) instead of a potentially much larger number of arrangements as may be the case for a parser 170 of the parser conversion system. For example consider that there may be N induction elements 50 in one set of induction elements of one phase of stage 60, then it is reasonable to construct a parser 170 for parser conversion topology 10y that has up to 3(N−1) switches for that set of induction elements. However the parsers 190, of the hybrid power conversion topology 10z, may contain as few as just three switches for the same set of N induction elements. Note that for either parser 170 or parser 190, each switch therein may require that electrical current be capable of flowing in either direction through the switch, which would then be a requirement of the physical realization of the switches in the construction of the parser.

Figure 7:
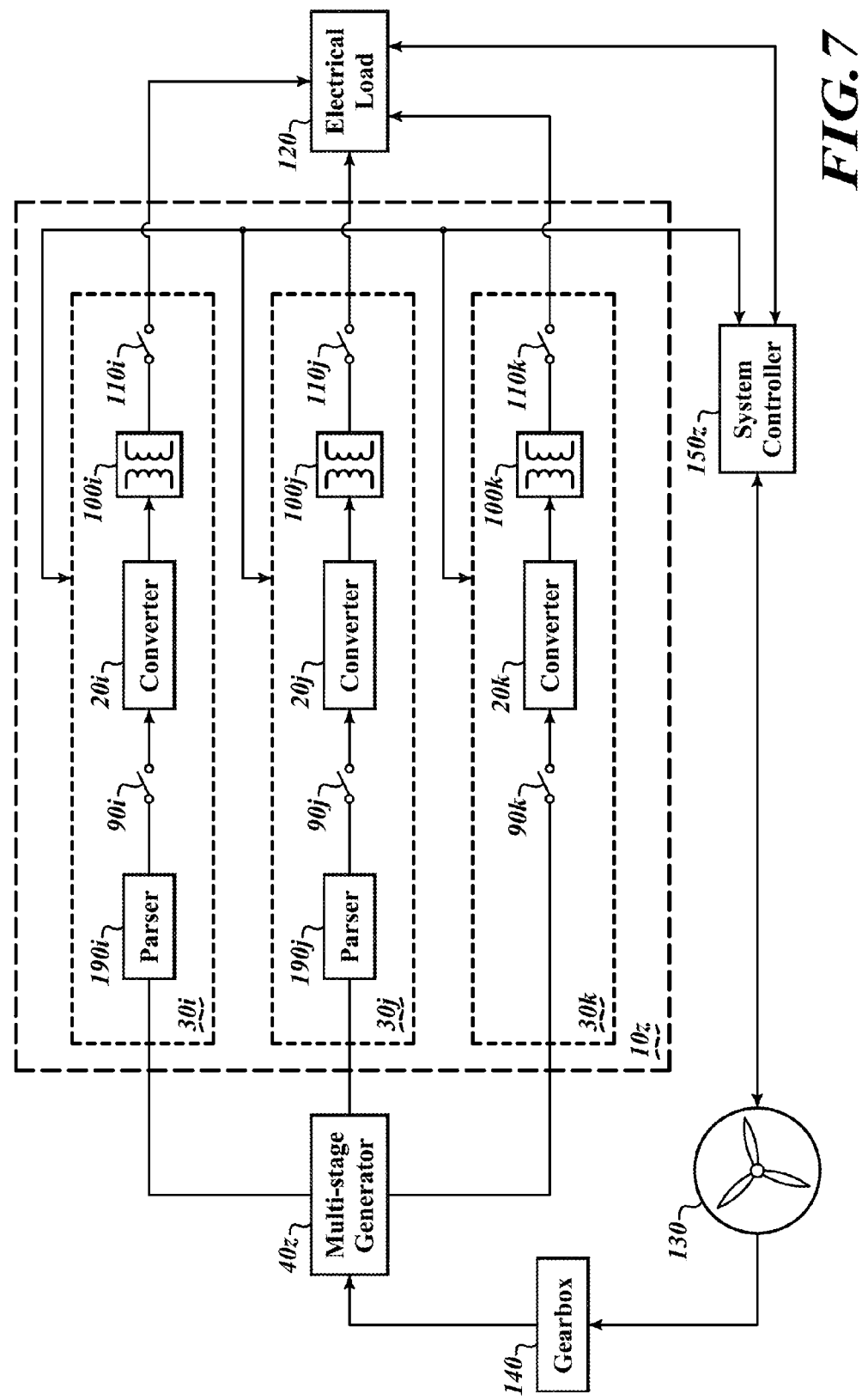
FIG. 7 is a block diagram of an embodiment of a turbine/generator/converter system wherein the interface includes a hybrid conversion topology.

As seen in FIG. 7, hybrid conversion topology 10z includes one or more branches 30. Each branch 30 may include a parser 190 if needed, an input switch 90 if needed, a converter 20, an optional transformer 100, and an output switch 110, all connected in series. The output switch 110 from each branch 30 is connected to electrical load 120, which may be an electric utility power grid. A key concept of hybrid conversion topology 10z, is that a given stage 60 of multi-stage generator 40z may be partially hardwired so that the stage may deliver power over more than one power range but not necessarily over the entire power range of the multi-stage generator 40z (for example stage 60i may operate over power range P1− to P2+ as well as power range P2− to P3+ but perhaps not power range P3− to $P_{max}$), thus two or more stages 60 may be delivering power simultaneously through two or more corresponding branches 30 of hybrid conversion topology 10z. The intention with this hybrid power conversion system embodiment is that when the TGC system is operating at its rated-power with multi-stage generator 40z operating at its rated-power, $P_{max}$, multiple high-power stages 60 (each containing a large number of induction elements 50) are actively delivering power, and hence the high machine utilization of multi-stage generator 40z.

Figure 8:
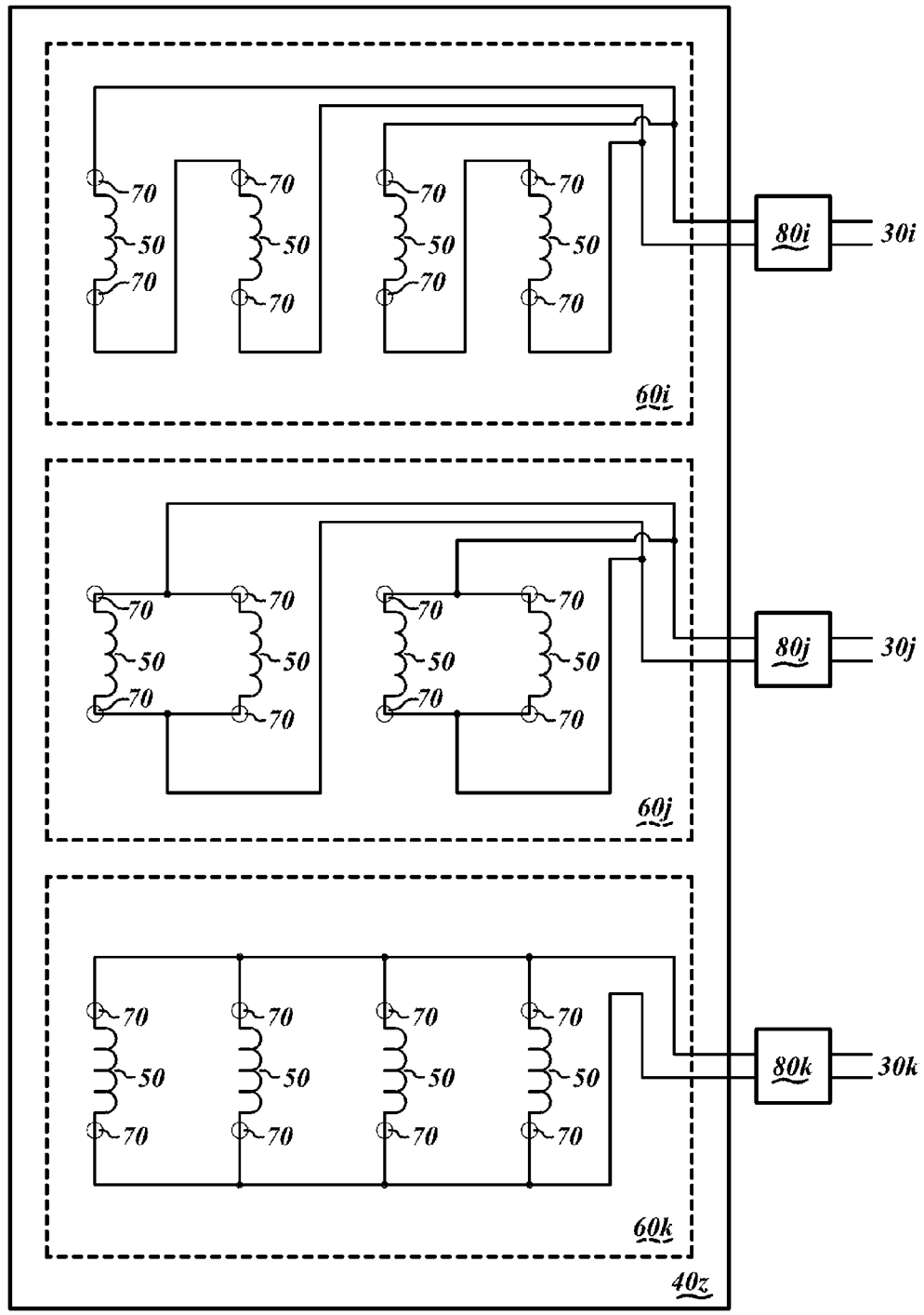
FIG. 8 is a block diagram of an embodiment of a multi-stage generator illustrating induction elements that may be hardwired to facilitate interface to a hybrid conversion topology.

FIG. 8 is an illustration of a partially hardwired multi-stage generator 40z. The partial hardwiring of induction element terminals 70 may be done within the casing of multi-stage generator 40z, or external to the casing. Alternatively, no casing is needed and terminals 70 may be within multi-stage generator 40 or external to multi-stage generator 40. As an example of partial hardwiring, it can be seen in FIG. 8 that in low power stages such as 60i, many induction elements 50 may be hardwired in a series-like manner. Thus, as power increases from multi-stage generator 40z, parser 190i may have the relatively simple task, under control of system controller 150z, of connecting two (or more) subsets of induction elements 50 (two subsets are illustrated within stage 60i in FIG. 8) in an extended series arrangement at the lower power levels, or the induction element subsets may be arranged in more parallel-like arrangements as the power increases from multi-stage generator 40z. Such reconfiguring of induction elements may be done to maintain the voltage to a converter 20, such as 20i, within a restricted range. Similarly, for higher power stages, such as stage 60j, it may be desirable to have subsets of induction elements 50 partially hardwired (in FIG. 8 this is illustrated by a parallel arrangement within each subset) and parser 190j has the task, under control of system controller 150z, of connecting two (or more) subsets of induction elements 50 (two subsets are illustrated within stage 60j in FIG. 8) in a series arrangement, or the subsets may be arranged in a more parallel-like arrangement as power increases from multi-stage generator 40z, to maintain the voltage to converter 20j within a restricted range. Note that the hardwired connections shown in FIG. 8 are purely illustrative, and in general there may be any practical number of induction elements 50 within a stage 60, possibly in polyphase arrangements, and a variety of series, parallel, or mixed series-parallel connections are possible.

For hybrid conversion topology 10z, in a similar fashion as the bank of converters topology 10x, the power rating of converter 20 and/or transformer 100 may increase geometrically from one stage 60 to the next, so that if at first stage 60i a relatively low power converter 20i is required, the next stage 60j may require a significantly higher power converter 20j, etc. For multi-stage generator 40z, it is possible for stage 60j to contain many more induction elements 50 than that of stage 60i, and similarly stage 60k might have many more induction elements than stage 60j. The power rating for converters 20 and transformers 100 within a hybrid conversion topology 10z may be higher than in the case of the bank of converters topology 10x, but there may be fewer branches in the hybrid conversion topology 10z given a specified power of the multi-stage generator 40. A parser 190 may not be needed for the highest power stage 60, such as 60k; a set of induction elements 50 of the highest power stage 60, such as 60k, may be connected in a hardwired manner, for example all induction elements 50 within one set of induction elements 50 for one phase of stage 60k may be hardwired in parallel as illustrated in FIG. 8.

Figure 9A:
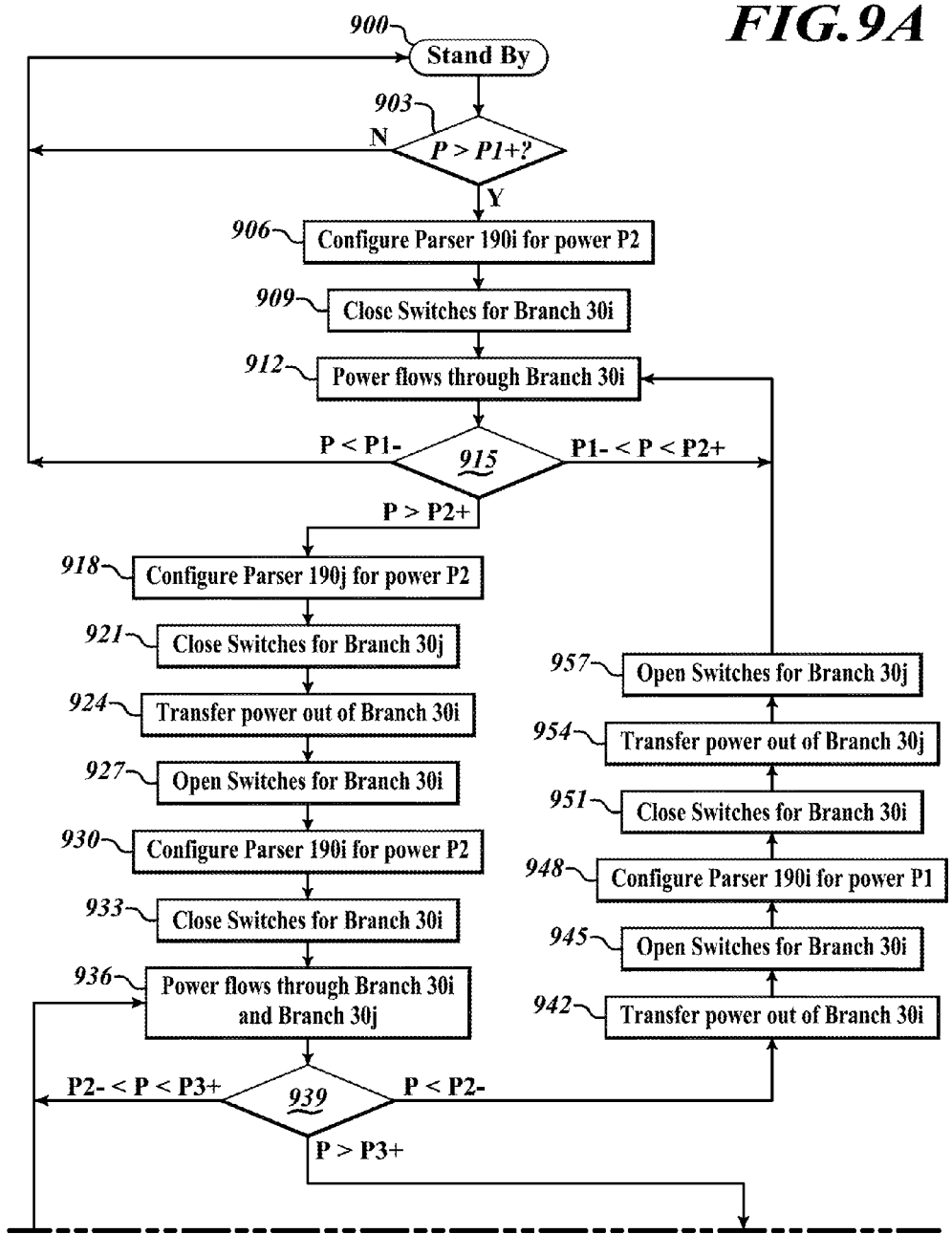
FIGS. 9A and 9B are a flowchart showing an example of a control process by which a hybrid conversion system converts electric power into a useable form.
Figure 9B:
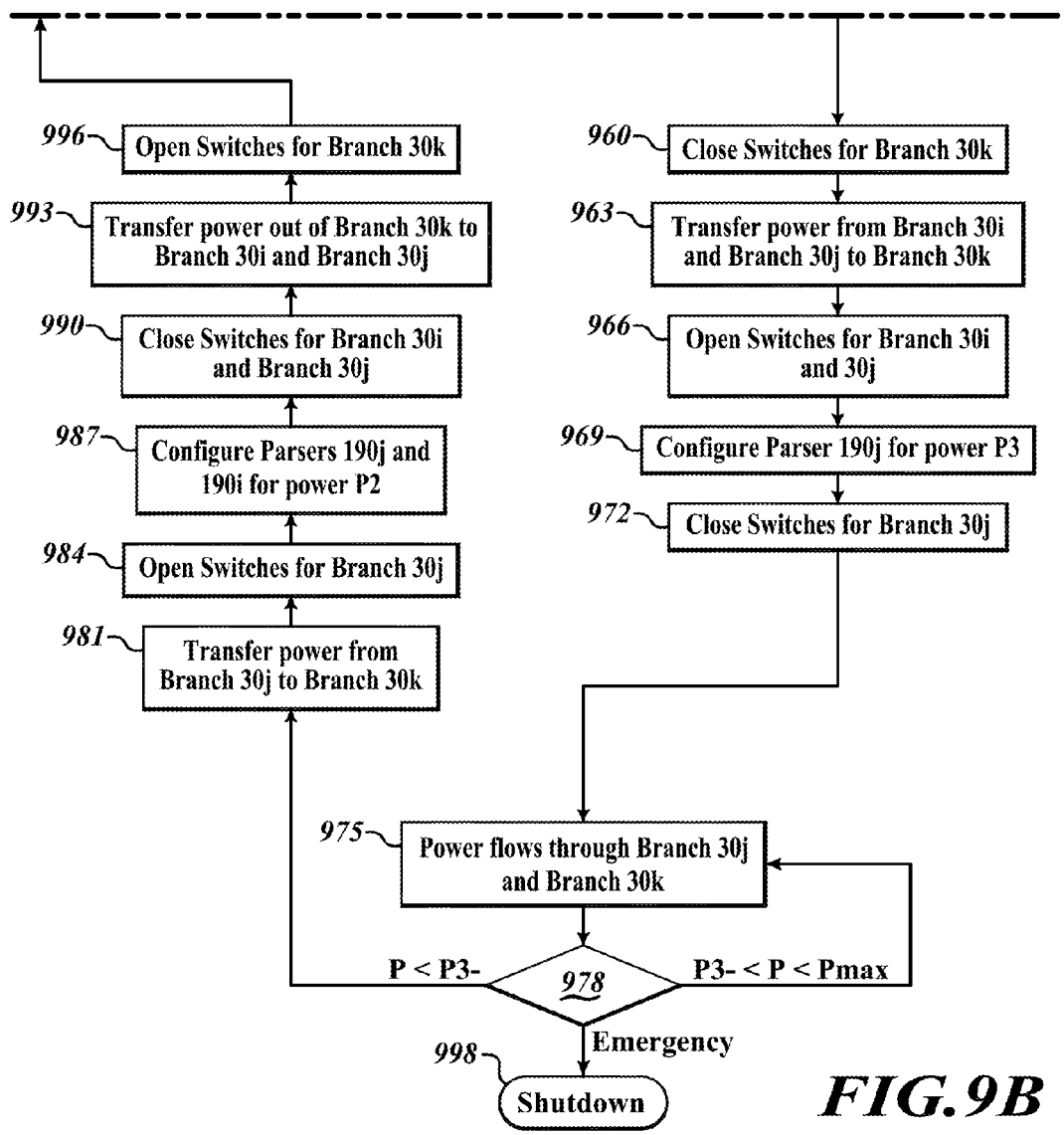

FIG. 9 is a flowchart showing an embodiment of a control process by which system controller 150z may control hybrid conversion topology 10z to transform the electric power produced by multi-stage generator 10z into a useable form for electrical load 120. System controller 150z, or its delegated sub-controller, makes decisions and executes tasks as outlined in the flowchart shown in FIG. 9. The illustrated control process generally seeks maximum energy capture mode and includes throttling of hybrid conversion topology 10z when multi-stage generator 40z is delivering its rated-power of $P_{max}$ to hybrid conversion topology 10z.

As seen in FIG. 9, the hybrid conversion system begins in a standby mode (step 900) when there is no power output from the multi-stage generator 40z. In standby mode all branches 30 of hybrid conversion topology 10z are disconnected from electrical load 120, i.e. input switches 90 and output switches 110 are all open, and any parsers 190 are pre-configured for a parallel arrangement of sub-sets of induction elements 50 (this is a fail-safe configuration that prevents excess voltage application to converters 20 in the event of accidental closing of input switch 90).

An internal system check may be done to determine if any of the induction elements 50 or branches 30 in the TGC system is malfunctioning. If a malfunctioning induction element 50 or branch 30 is found, it is disabled by keeping open at all times associated input switch 90 and output switch 110, and the induction element 50 or branch 30 is not used during power delivery (until a suitable time can be found for repair of the malfunctioning part).

Under control of system controller 150z voltage is induced in induction elements 50 if there is sufficient fluid flow in turbine 130 to rotate of the shaft of multi-stage generator 40z. System controller 150z maintains all branch input switches 90 open and/or all branch output switches 110 open (step 900) until multi-stage generator 40z produces power exceeding pre-defined threshold level, P1+ (step 903), when parser 190i is configured for the lowest power level P1, i.e. parser 190i is configured for power level range P1− to P2+ (step 906). Therefore parser 190*i* may connect one or more sub-sets of induction elements 50 within stage 60*i* in a series-like arrangement. The corresponding input and output switches 90*i* and 110*i* then are closed, preferably in that order (step 909) and power begins to flow from multi-stage generator 40*z* though the stage 60*i* and branch 30*i* to electrical load 120 (step 912).

As power flows through branch 30*i* (step 912), system controller 150*z* monitors the output power level of multi-stage generator 40*z* (step 915), and if the power level is between P1− and P2+, then the system controller 150*z* retains the power flow through branch 30*i* (step 912).

If (at step 915) the power level drops below P1−, the system returns to standby mode (step 900), meaning that power flow in branch 30*i* is reduced to zero and switches 110*i* and 90*i* are opened, preferably in that order. Note that in general it may be possible for system controller 150*z* to return the system to standby from other steps such as, but not restricted to, steps 939 or 978.

If (at step 915) the power level exceeds P2+, parser 190*j* is configured for power level range P2− to P3+ (step 918). Then switches 90*j* and 110*j* are closed (step 921). Power flow is transferred out of branch 30*i* by system controller 150*z* to branch 30*j* (step 924) temporarily, so that switches 110*i* and 90*i* are opened if necessary (step 927), and system controller 150*z* now configures parser 190*i* for the next higher power range P2− to P3+ (step 930). Input and output switches 90*i* and 110*i* are then closed (step 933), and power is controlled by system controller 150*z* to flow though both branches 30*i* and 30*j* (step 936), possibly with approximately equal power in each branch. All the above steps (and those discussed below) may be conducted by system controller 150*z* so that there is no interruption of power delivery to electrical load 120.

As power flows through branches 30*i* and 30*j* (step 936), system controller 150*z* monitors the output power level of multi-stage generator 40*z* (step 939), and if the power level is between P2− and P3+, then the system controller 150*z* retains the power flow through branches 30*i* and 30*j* (step 936).

If (at step 939) the power level drops below P2−, then system controller 150*z* returns power flow in hybrid conversion topology 10*z* to branch 30*i* possibly using the following sequence of steps. All power is transferred temporarily from branch 30*i* to 30*j* (step 942). Switches 110*i* and 90*i* are opened (step 945). Parser 190*i* is reconfigured for power level range P1− to P2+ (step 948). Switches 90*i* and 110*i* are closed (step 951). All power is transferred from branch 30*j* to branch 30*i* (step 954). Switches 110*j* and 90*j* are opened (step 957), and power now flows through branch 30*i* (step 912).

If (at step 939) the power level exceeds P3+, switches 90*j* and 110*j* are closed (step 960). Power flow may be transferred out of branches 30*i* and 30*j* by system controller 150*z* to branch 30*k* (step 963) temporarily, so that switches 110*j* and 90*j* are opened if necessary (step 966), and system controller 150*z* now configures parser 190*j* for the next higher power range P3− to $P_{max}$ (step 969). Input and output switches 90*j* and 110*j* are then closed (step 972), and power is controlled by system controller 150*z* to flow though branches 30*j* and 30*k* (step 975), possibly with approximately equal power in each branch.

As power flows through branches 30*j* and 30*k* (step 975), system controller 150*z* monitors the output power level of multi-stage generator 40*z* (step 978), and if the power level is between P3− and $P_{max}$, then system controller 150*z* retains the power flow through branches 30*j* and 30*k* (step 975). Note that $P_{max}$ is the rated-power of multi-stage generator 40*z*, and hence system controller 150*z* may enter throttling mode when this power level is achieved.

If (at step 978) the power level drops below P3−, the controller returns power flow in hybrid conversion topology 10*z* to branches 30*i* and 30*j* possibly using the following sequence of steps. All power is transferred temporarily from branch 30*j* to 30*k* (step 981). Switches 110*j* and 90*j* are opened (step 984). Parsers 190*j* and 190*i* are reconfigured for power level range P2− to P3+ (step 987). Switches 90*j* and 110*j* are closed (if desirable, some power transfer into branch 30*j* may begin at this time) and also switches 90*i* and 110*i* are closed (step 990). All power is transferred from branch 30*k* to branches 30*j* and 30*i* (step 993). Switches 110*k* and 90*k* are opened (step 996), and power now flows through branches 30*i* and 30*j* (step 936). Note there may be variations in how system controller accomplishes this transfer of power to branches 30*i* and 30*j*, for example power transfer from branch 30*k* to branch 30*i* may take place first, followed by a transfer of power from branch 30*k* to branch 30*j*.

If (at step 978) or for that matter at other steps, including, but not restricted to, steps 915 and 939, an emergency condition arises, it may be necessary for system controller 150*z* to shut down operation of the TGC system by setting power flow through the TGC system to zero and preferably stopping rotation of turbine 130 (step 998).

For the illustrated hybrid conversion system embodiment, the activation or deactivation of a branch may be initiated when a power threshold is crossed, however, system controller 150*z* may alternatively initiate the activation or deactivation of a branch 30 using other system variables such as, but not restricted to: the speed of fluid flowing in or around turbine 130; the rotational speed of turbine 130; the rotational speed of a multi-stage generator 40*z*; the output voltage of stages 60 as may be measured at a terminal-block 80 or directly across one or more induction elements 50 of a multi-stage generator 40; and/or the input voltage to hybrid conversion topology 10*z*.

The above discussed principles of operation for a hybrid conversion system may be extended (or simplified) to cases where there are more than (or fewer than) three branches. In general, there may be any number of branches 30 within a hybrid conversion topology 10*z*. Note, for the hybrid conversion system, that there is no theoretical restriction on the number stages 60 of multi-stage machine 40*z*, and no theoretical restriction on the number of branches 30 of hybrid conversion topology 10*z*, that may be active and delivering power. As an example, consider the situation illustrated in FIG. 7, if it is desirable that branches 30*i*, 30*j*, 30*k* are all delivering power to electrical load 120 when multi-stage generator 40*z* is operating at a power between P2− and $P_{max}$, and parser 190*j* is configured for that power range as discussed above, but in addition, parser 190*i* may reconfigured the arrangement of induction elements 50 within stage 60*i* for power range P2− to $P_{max}$. This means that the partial hardwiring of stage 60*i* and the design of parser 190*i* both accommodate this possibility.

Variations of the Hybrid Conversion System

An issue with a hybrid conversion system is that the stages 60 and branches 30 designed for the lower power ranges, for example stage 60*i* and branch 30*i*, are each inherently less efficient in power transformation than the higher power stages and branches. Thus, the advantage of using parser 190*i* to extend the power range over which stage 60*i* and branch 30*i* may operate is compromised, particularly at the lowest power levels, such as P1− or P1+. For example, in the above discussion of the hybrid conversion system, referring to FIG. 9, stage 60*i* and branch 30*i* may be designed to operate over power range P1– to P2+ as well as over range P2– to P3+, thus at power level P1–, the efficiency of stage 60*i* and/or branch 30*i* may be poor.

To overcome the efficiency degradation at lower power levels, a variation of the hybrid conversion system may employ no parser within the lowest power branch(es) 30 of the hybrid conversion topology. For example, a hybrid conversion topology that includes three branches may be constructed such that branch 30*i* may be structured as shown in FIG. 1 and branches 30*j* and 30*k* may be structured as shown in FIG. 7. Thus stage 60*i* and branch 30*i* of this hybrid conversion topology may operate only over power range P1– to P2+ and will likely be much more efficient than the stage 60*i* and branch 30*i* pair of FIG. 7 designed to operate over power range P1– to P3+. With this variation of the hybrid conversion system there is, once again, no theoretical restriction on the number of stages or the number of branches.

Figure 12:
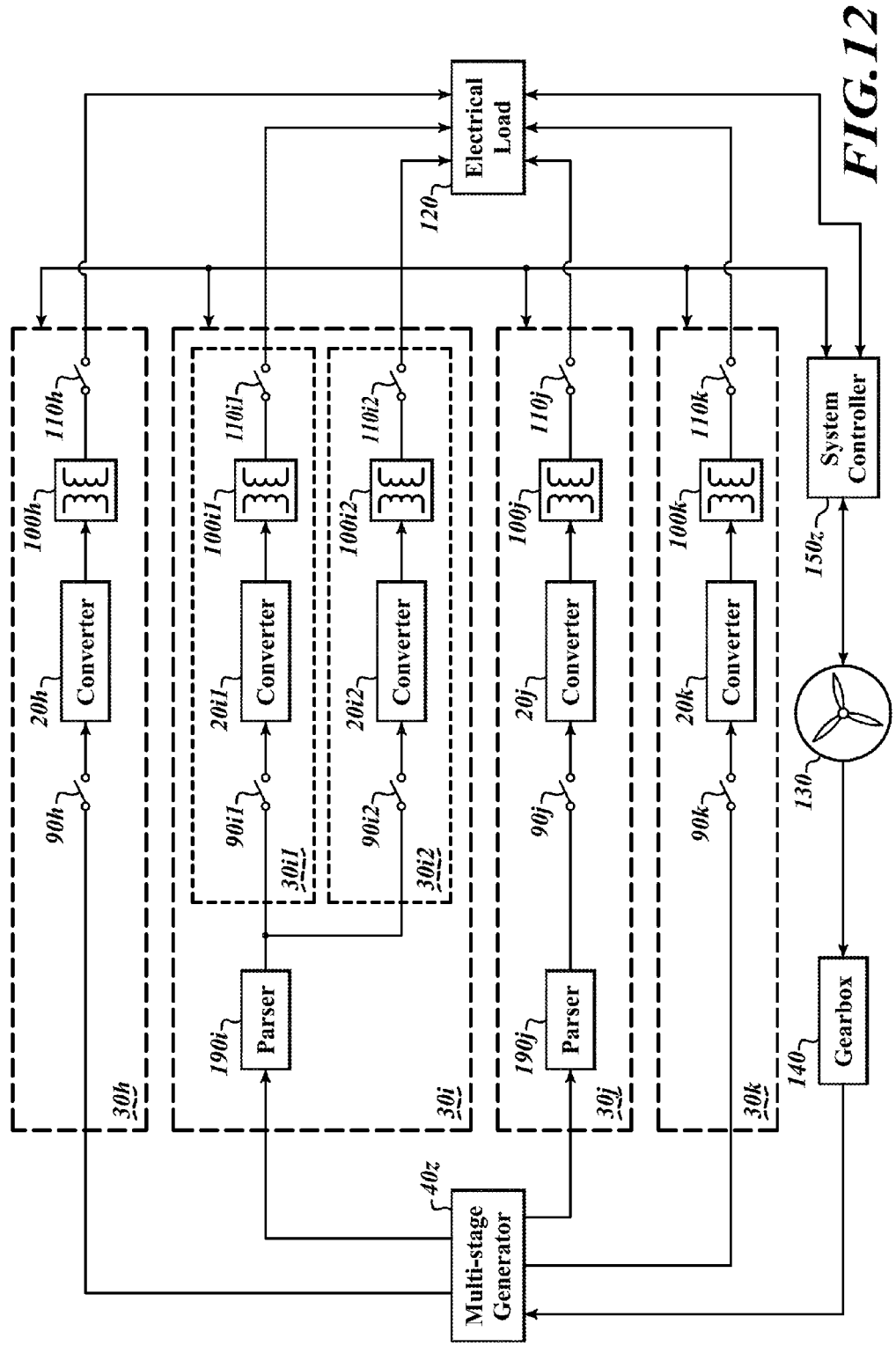
FIG. 12 is a block diagram of a further alternative embodiment of a turbine/generator/converter system, wherein the interface includes a hybrid conversion topology employing a forked branch.

Another variation of the hybrid conversion system is to employ forked branches for one or more stages 60. For example, an embodiment may have a hybrid conversion topology with four branches: 30*h*, 30*i*, 30*j*, and 30*k*. Branch 30*h*, the lowest power branch, may be structured to have no parser. Branch 30*i* may be forked with two sub-branches, sub-branch 30*i*1 and sub-branch 30*i*2. Branches 30*j* and 30*k* may be structured as in FIG. 7. An example of this variation of the hybrid conversion system is shown in FIG. 12. In this embodiment, when the multi-stage generator 40 is operating within its highest power range, up to and including rated-power $P_{max}$, sub-branch 30*i*2, branch 30*j* and branch 30*k* may all be active and delivering power to electrical load 120. In this variation of the hybrid conversion system there is, once again, no theoretical restriction on the number of stages or the number of branches.

The various embodiments described above can be combined to provide further embodiments. All of the commonly assigned US patent application publications, U.S. patent applications, foreign patents, and foreign patent applications referred to in this specification and/or listed in the Application Data Sheet, including but not limited to U.S. application Ser. No. 13/062,191, filed Jun. 17, 2011; PCT application Serial No. PCT/CA2009/001233, filed Sep. 3, 2009; and U.S. provisional patent application Ser. No. 61/094,007, filed Sep. 3, 2008 are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Specific embodiments have been shown and described herein. However, modifications and variations may occur to those skilled in the art. All such modifications and variations are believed to be within the scope and sphere of the present invention.

We claim:

1. A method of connecting a power generator comprising a plurality of stages to an electrical load, each of said stages connected to said load via a corresponding branch having a converter and a parallel series selector, each of said converters having the same power range, comprising:

(a) determining a power output of said generator;
   (b) configuring at least one of said parallel series selectors for said power output;
   (c) selecting one or more of said branches corresponding to said configured parallel series selectors; and
   (d) passing said power output to said electrical load along said selected one or more branches.

2. The method of claim 1, wherein each of said one or more branches further comprises a transformer.

3. The method of claim 2 wherein each of said selected one or more branches is selected using a switch.

4. The method of claim 3 wherein said electrical load is an electric grid.

5. An electric power generation system, comprising:
   a prime mover;
   a multi-stage generator having a plurality of machine configurations each selectively engageable by said prime mover to generate electrical power; and
   a power conversion system that in use delivers electrical power from said multi-stage generator to an electrical load, said power conversion system having a plurality of branches for connecting said multi-stage generator to said electrical load, each of said plurality of branches comprising a converter, wherein each of the said converters has a respective power range, the respective power range of at least one of said converters different from the respective power ranges of at least one of the other of said converters, and each machine configuration of said multi-stage generator is associated with a corresponding branch of said plurality of branches so that for each machine configuration of said multi-stage generator electrical power is delivered from said multi-stage generator to said electrical load via said corresponding branch of said plurality of branches of the power conversion system.

6. The electric power system of claim 5 wherein said multi-stage generator comprises a plurality of induction elements, and wherein said plurality of machine configurations comprise groups of said plurality of induction elements electrically configured in any of: in series, in parallel, or in series and parallel combinations.

7. The electric power system of claim 5 wherein said multi-stage generator comprises a plurality of induction elements, and wherein said plurality of machine configurations comprise configurations in which voltage is induced in different groups of said plurality of induction elements by movement of said prime mover.

8. The electric power system of claim 5, further comprising:
   a system controller for dynamically selecting a machine configuration of said multi-stage generator and a corresponding branch of said power conversion system based on at least one of: an operating parameter of said prime mover and an operating parameter of said electrical load.

9. The electric power system of claim 8 wherein said system controller controls operation of said prime mover.

10. The electric power system of claim 5 wherein said prime mover is directly coupled to said multi-stage generator.

11. The electric power system of claim 5, further comprising:
    a gearbox for mechanically coupling said prime mover to said multi-stage generator.

12. The electrical power system of claim 5 wherein said electrical load is an electrical grid.

* * * * *